(12) United States Patent
Sharma et al.

(10) Patent No.: US 12,135,627 B1
(45) Date of Patent: Nov. 5, 2024

(54) FACILITATING MANAGEMENT OF COLLECTION AGENTS

(71) Applicant: SPLUNK INC., San Francisco, CA (US)

(72) Inventors: Dinesh Dutt Sharma, Pleasanton, CA (US); Chaitanya Sunil Phalak, San Francisco, CA (US); Kyung Rock Baek, Santa Clara, CA (US); Vinu K. Alazath, Santa Clara, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 17/589,283

(22) Filed: Jan. 31, 2022

(51) Int. Cl.
*G06F 11/30* (2006.01)
(52) U.S. Cl.
CPC ...... *G06F 11/3089* (2013.01); *G06F 11/3006* (2013.01); *G06F 11/3072* (2013.01)
(58) Field of Classification Search
None
See application file for complete search history.

(56) References Cited

U.S. PATENT DOCUMENTS

| | | | |
|---|---|---|---|
| 6,754,664 B1 | 6/2004 | Bush | |
| 7,526,540 B2 | 4/2009 | Gopisetty et al. | |
| 7,937,344 B2 | 5/2011 | Baum et al. | |
| 8,019,851 B2 | 9/2011 | Nagarajrao et al. | |
| 8,112,425 B2 | 2/2012 | Baum et al. | |
| 8,352,535 B2 | 1/2013 | Peled et al. | |
| 8,527,624 B2 | 9/2013 | Chen et al. | |
| 8,613,083 B1 | 12/2013 | Njemanze et al. | |
| 8,626,115 B2 | 1/2014 | Raleigh et al. | |
| 8,627,328 B2 | 1/2014 | Mousseau et al. | |
| 8,634,805 B2 | 1/2014 | Raleigh | |
| 8,683,547 B2 | 3/2014 | Apparao et al. | |
| 8,751,529 B2 | 6/2014 | Zhang et al. | |
| 8,788,525 B2 | 7/2014 | Neels et al. | |
| 8,898,293 B2 | 11/2014 | Raleigh et al. | |
| 9,215,240 B2 | 12/2015 | Merza et al. | |
| 9,286,413 B1 | 3/2016 | Coates et al. | |
| 9,495,652 B1 | 11/2016 | Cook | |
| 9,887,889 B1 | 2/2018 | Dippenaar | |
| 10,127,258 B2 | 11/2018 | Lamas et al. | |

(Continued)

OTHER PUBLICATIONS

Bitincka, L., et al., "Optimizing Data Analysis with a Semi-structured Time Series Database", self-published, First presented at Workshop on Managing Systems via Log Analysis and Machine Learning Techniques (SLAML), pp. 1-16 (Oct. 3, 2010).

(Continued)

*Primary Examiner* — Anh Nguyen
(74) *Attorney, Agent, or Firm* — Shook, Hardy & Bacon L.L.P.

(57) ABSTRACT

Embodiments described herein are directed to facilitating management of collection agents. In one embodiment, a control request is received at an agent service manager from an agent controller that manages collection agents that collect data. The agent controller and the collection agents operate on a remote computing machine. A desired agent event is identified to be executed in association with a set of collection agent of the collection agents. An indication of the desired agent event is provided to the agent controller for execution of the desired agent event in association with each collection agent of the set of collection agents.

18 Claims, 17 Drawing Sheets

(56) References Cited

U.S. PATENT DOCUMENTS

| | | |
|---|---|---|
| 11,552,868 B1 | 1/2023 | Cole et al. |
| 11,619,512 B1 | 4/2023 | Gupta et al. |
| 2004/0054782 A1 | 3/2004 | Donze et al. |
| 2004/0230832 A1 | 11/2004 | McCallam et al. |
| 2005/0021598 A1 | 1/2005 | Dunlop et al. |
| 2005/0237947 A1 | 10/2005 | Ando et al. |
| 2008/0201468 A1 | 8/2008 | Titus |
| 2009/0259749 A1 | 10/2009 | Barrett et al. |
| 2010/0205299 A1 | 8/2010 | Nagarajrao et al. |
| 2012/0001238 A1 | 1/2012 | Rathod |
| 2012/0089845 A1 | 4/2012 | Raleigh |
| 2012/0096513 A1 | 4/2012 | Raleigh et al. |
| 2013/0080641 A1 | 3/2013 | Lui et al. |
| 2014/0047107 A1 | 2/2014 | Maturana et al. |
| 2014/0101665 A1 | 4/2014 | Mousseau et al. |
| 2017/0012812 A1 | 1/2017 | Gotoh et al. |
| 2017/0318104 A1 | 11/2017 | Angeles |
| 2018/0124072 A1* | 5/2018 | Hamdi ............... G06F 11/3428 |
| 2018/0219743 A1 | 8/2018 | Garcia et al. |
| 2018/0219909 A1 | 8/2018 | Gorodissky et al. |
| 2018/0302486 A1* | 10/2018 | Ma ..................... H04L 67/1004 |
| 2018/0375828 A1 | 12/2018 | Rawat et al. |
| 2019/0082044 A1* | 3/2019 | Melendez ............. H04W 4/023 |
| 2019/0098106 A1 | 3/2019 | Mungel et al. |
| 2019/0245883 A1 | 8/2019 | Gorodissky et al. |
| 2021/0211356 A1 | 7/2021 | Gati et al. |
| 2021/0271506 A1 | 9/2021 | Ganguly et al. |
| 2022/0019935 A1* | 1/2022 | Ghatage .............. G06F 11/3065 |
| 2022/0335154 A1* | 10/2022 | Schuler ............... G06F 21/6245 |
| 2023/0179485 A1 | 6/2023 | Bhatnagar et al. |
| 2023/0291716 A1 | 9/2023 | Rawat et al. |

OTHER PUBLICATIONS

Carasso, D., "Exploring Splunk," Search Processing Language (SPL) Primer and Cookbook, pp. 156 (Apr. 2012).

"Splunk Cloud 8.0.2004 User Manual", available online, Retrieved from docs.splunk.com on May 20, 2020, pp. 1-66.

"Splunk Quick Reference Guide", Retrieved from: https://www.splunk.com/pdfs/solution-guides/splunk-quick-reference-guide.pdf, on May 20, 2020, pp. 1-6.

"Splunk Enterprise 8.0.0 Overview", available online, Retrieved from docs.splunk.com on May 20, 2020, pp. 1-17.

* cited by examiner

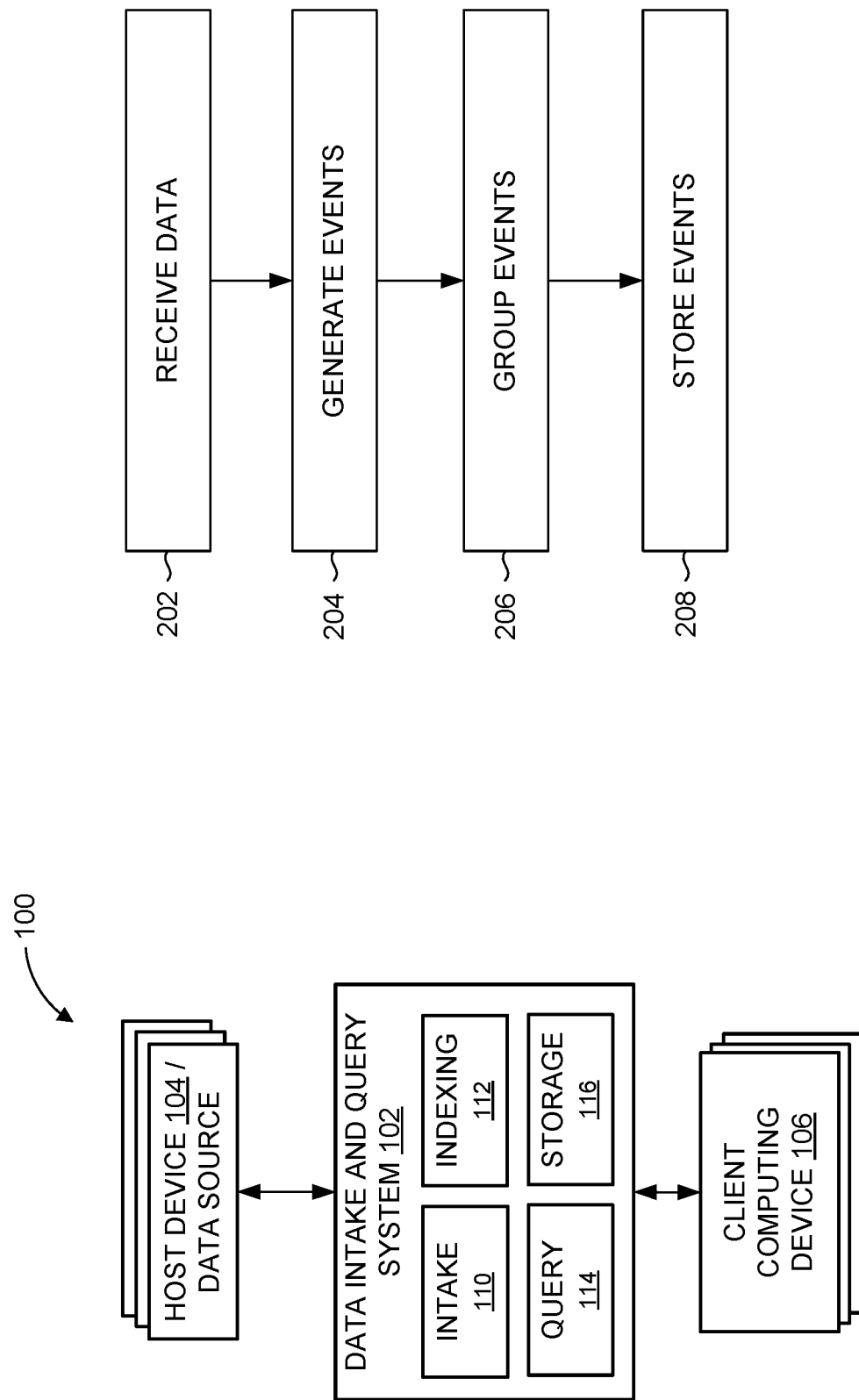

```
                                            ┌─ 302
                                         ↙
                                               ┌─302A
127.0.0.1 – eva [10/Oct/2000:13:55:36-0700] "GET/apache.gif HTTP/1.0" 200  2326  0.0947
127.0.0.1 – emerson [10/Oct/2000:13:56:36-0700] "GET/eastwood.gif HTTP/1.0" 200 2980
0.0899                 ┌─302C        └─302B
127.0.0.3 – eliza [10/Oct/2000:13:57:36-0700] "GET/ezra.gif HTTP/1.0" 200 2900 0.0857
[Sunday Oct 10 1:58:33 2010] [error] [client 127.10.1.1.015] File does not exist: /home/emmeline/
pub_html/images/alisia.gif          ┌─302E            └─302D
91.205.189.15 - - [28/Apr/2014:18:22:16] *GET /oldlink?itemId=EST-
14&JSESSIONID=SD6SL7FF7ADFF53113 HTTP 1.1" 200 1665 "http://
www.buttercupgames.com/oldlink?itemId=EST-14" "Mozilla/5.0 (Windwos NT 6.1; WOW 64)
AppleWebKit/536.5 (KHTML, like Gecko) Chrome/19.0.1084.46 Safari/536.5" 159

┌─ 304
        ↙
docker: {
        container_id: f7360a148a670c4c257f4ee024be81284b6017d72ae41ea8ee5d
}                                         ┌─304A
kubernetes: {                          ↙
        container_name: kube-apiserver
        host: ip-172-20-43-173.ec2.internal
        labels: {
          k8s-app: kube-apiserver
        }
master_url: https://100.64.0.1:443/api
namespace_id: e5af26aa-4ef9-11e8-a4e1-0a2bf2ab4bba
namespace_name: kube-system
pod_id: 0a73017b-4efa-11e8-a4e1-0a2bf2ab4bba
pod_name: kube-apiserver-ip-172-20-43-173.ec2.internal    ┌─304B
}                                                      ↙
log: I0503 23:04:12.595203     1 wrap.go:42] GET /apis/admissionregistrations.k8s.io/v1beta1/
validatingwebhookconfiguration 200 [[kube-apiserver/v1.9.3 (linux/amd64) kubernetes/d283541]
127.0.0.1:55026 stream: stdout
time: 2018-05-03T23:04:12.619948395Z
}
```

| time | ID | CPU | memory |
|---|---|---|---|
| 10/10/00 12:01:00.013 | eliza | 14% | 80% |
| 10/10/00 12:01:05.153 | eva | 26% | 70% |

FIG. 3A

FACILITATING MANAGEMENT OF COLLECTION AGENTS

RELATED APPLICATIONS

This application is related to U.S. patent application Ser. No. 17/589,127, titled "MANAGING COLLECTION AGENTS VIA AN AGENT CONTROLLER," filed Jan. 31, 2022, which is incorporated by reference herein in its entirety.

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 1 is a block diagram of an embodiment of a data processing environment.

FIG. 2 is a flow diagram illustrating an embodiment of a routine implemented by the data intake and query system to process, index, and store data.

FIG. 3A is a block diagram illustrating an embodiment of machine data received by the data intake and query system.

DETAILED DESCRIPTION

Figure 3B:
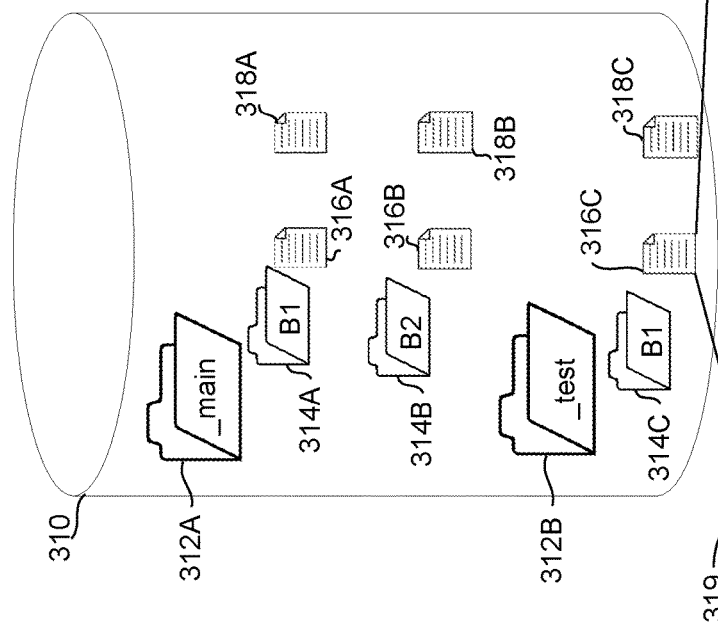
FIGS. 3B and 3C are block diagrams illustrating embodiments of various data structures for storing data processed by the data intake and query system.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that concurrently report these types of information.

These challenges can be addressed by using an event-based data intake and query system, such as the SPLUNK® ENTERPRISE, SPLUNK® CLOUD, or SPLUNK® CLOUD SERVICE system developed by Splunk Inc. of San Francisco, California. These systems represent the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The time stamp may be derived from the portion of machine data in the event, determined through interpolation between temporally proximate events having known timestamps, and/or may be determined based on other configurable rules for associating timestamps with events.

In some instances, machine data can have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system can use flexible schema to specify how to extract information from events. A flexible schema may be developed and redefined as needed. The flexible schema can be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

As used herein, the term "field" can refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file can include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or sourcetype. When events are to be searched based on a particular field name specified in a search, the system can use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system can utilize a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from machine data or events. In some cases, an extraction rule comprises a regular expression, where a sequence of characters form a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a latebinding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some embodiments, the configuration files and/or extraction rules described above can be stored in a catalog, such as a metadata catalog. In certain embodiments, the content of the extraction rules can be stored as rules or actions in the metadata catalog. For example, the identification of the data to which the extraction rule applies can be referred to a rule and the processing of the data can be referred to as an action.

1.0. Operating Environment

FIG. 1 is a block diagram of an embodiment of a data processing environment 100. In the illustrated embodiment, the environment 100 includes a data intake and query system 102, one or more host devices 104, and one or more client computing devices 106 (generically referred to as client device(s) 106).

The data intake and query system 102, host devices 104, and client devices 106 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a client computing device 106 can communicate with a host device 104 via one or more networks. For example, if the host device 104 is configured as a web server and the client computing device 106 is a laptop, the laptop can communicate with the web server to view a website.

A client device 106 can correspond to a distinct computing device that can configure, manage, or sends queries to the system 102. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, a client device 106 can include a hosted, virtualized, or containerized device, such as an isolated execution environment, that shares computing resources (e.g., processor, memory, etc.) of a particular machine with other isolated execution environments.

The client devices 106 can interact with the system 102 (or a host device 104) in a variety of ways. For example, the client devices 106 can communicate with the system 102 (or a host device 104) over an Internet (Web) protocol, via a gateway, via a command line interface, via a software developer kit (SDK), a standalone application, etc. As another example, the client devices 106 can use one or more executable applications or programs to interface with the system 102.

A host device 104 can correspond to a distinct computing device or system that includes or has access to data that can be ingested, indexed, and/or searched by the system 102. Accordingly, in some cases, a client device 106 may also be a host device 104 (e.g., it can include data that is ingested by the system 102 and it can submit queries to the system 102). The host devices 104 can include, but are not limited to, servers, sensors, routers, personal computers, mobile devices, internet of things (JOT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory, computer-readable media, etc.). In certain cases, a host device 104 can include a hosted, virtualized, or containerized device, such as an isolated execution environment, that shares computing resources (e.g., processor, memory, etc.) of a particular machine (e.g., a hosting device or hosting machine) with other isolated execution environments.

As mentioned host devices 104 can include or have access to data sources for the system 102. The data sources can include machine data found in log files, data files, distributed file systems, streaming data, publication-subscribe (pub/sub) buffers, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

In some cases, one or more applications executing on a host device may generate various types of machine data during operation. For example, a web server application executing on a host device 104 may generate one or more web server logs detailing interactions between the web server and any number of client devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases can be used as a data source for the system 102.

In some embodiments, an application may include a monitoring component that facilitates generating performance data related to host device's operating state, including monitoring network traffic sent and received from the host device and collecting other device and/or application-specific information. A monitoring component may be an integrated component of the application, a plug-in, an extension, or any other type of add-on component, or a stand-alone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time(s), failure, etc.)) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component can collect device performance information by monitoring one or more host device operations, or by making calls to an operating system and/or one or more other applications executing on a host device for performance information. The monitored information may be stored in one or more files and/or streamed to the system 102.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

In some embodiments, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain embodiments, each isolated execution environment may be treated as a separate host device 104 even if they are, in fact, executing on the same computing device or hosting device.

Accordingly, as used herein, obtaining data from a data source may refer to communicating with a host device 104 to obtain data from the host device 104 (e.g., from one or more data source files, data streams, directories on the host device 104, etc.). For example, obtaining data from a data source may refer to requesting data from a host device 104 and/or receiving data from a host device 104. In some such cases, the host device 104 can retrieve and return the requested data from a particular data source and/or the system 102 can retrieve the data from a particular data source of the host device 104 (e.g., from a particular file stored on a host device 104).

The data intake and query system 102 can ingest, index, and/or store data from heterogeneous data sources and/or host devices 104. For example, the system 102 can ingest, index, and/or store any type of machine data, regardless of the form of the machine data or whether the machine data matches or is similar to other machine data ingested, indexed, and/or stored by the system 102. In some cases, the system 102 can generate events from the received data, group the events, and store the events in buckets. The system 102 can also search heterogeneous data that it has stored or search data stored by other systems (e.g., other system 102 systems or other non-system 102 systems). For example, in response to received queries, the system 102 can assign one or more components to search events stored in the storage system or search data stored elsewhere.

As will be described herein in greater detail below, the system 102 can use one or more components to ingest, index, store, and/or search data. In some embodiments, the system 102 is implemented as a distributed system that uses multiple components to perform its various functions. For example, the system 102 can include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated embodiment, the system 102 is shown having four subsystems 110, 112, 114, 116. However, it will be understood that the system 102 may include any one or any combination of the intake system 110, indexing system 112, query system 114, or storage system 116. Further, in certain embodiments, one or more of the intake system 110, indexing system 112, query system 114, or storage system 116 may be used alone or apart from the system 102. For example, the intake system 110 may be used alone to glean information from streaming data that is not indexed or stored by the system 102, or the query system 114 may be used to search data that is unaffiliated with the system 102.

In certain embodiments, the components of the different systems may be distinct from each other or there may be some overlap. For example, one component of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like Amazon S3, that is accessible to distinct components of the intake system 110, indexing system 112, and query system 114.

In some cases, the components of the system 102 are implemented as distinct computing devices having their own computer hardware (e.g., processors, non-transitory, computer-readable media, etc.) and/or as distinct hosted devices (e.g., isolated execution environments) that share computing resources or hardware in a shared computing resource environment.

For simplicity, references made herein to the intake system 110, indexing system 112, storage system 116, and query system 114 can refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

As will be described in greater detail herein, the intake system 110 can receive data from the host devices 104 or data sources, perform one or more preliminary processing operations on the data, and communicate the data to the indexing system 112, query system 114, storage system 116, or to other systems (which may include, for example, data processing systems, telemetry systems, real-time analytics systems, data stores, databases, etc., any of which may be operated by an operator of the system 102 or a third party). Given the amount of data that can be ingested by the intake system 110, in some embodiments, the intake system can include multiple distributed computing devices or components working concurrently to ingest the data.

The intake system 110 can receive data from the host devices 104 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 110 can include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 can route the data to a particular component of the intake system 110 or dynamically route the data based on load-balancing, etc. In certain cases, one or more components of the intake system 110 can be installed on a host device 104.

1.4.2. Indexing System Overview

As will be described in greater detail herein, the indexing system 112 can include one or more components (e.g., indexing nodes) to process the data and store it, for example, in the storage system 116. As part of processing the data, the indexing system can identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 can update various catalogs or databases with information related to the buckets (pre-merged or merged) or data that is stored in the storage system 116, and can communicate with the intake system 110 about the status of the data storage.

As will be described in greater detail herein, the query system 114 can include one or more components to receive, process, and execute queries. In some cases, the query system 114 can use the same component to process and execute the query or use one or more components to receive and process the query (e.g., a search head) and use one or more other components to execute at least a portion of the query (e.g., search nodes). In some cases, a search node and an indexing node may refer to the same computing device or hosted device performing different functions. In certain cases, a search node can be a separate computing device or hosted device from an indexing node.

Queries received by the query system 114 can be relatively complex and identify a set of data to be processed and a manner of processing the set of data from one or more client devices 106. In certain cases, the query can be implemented using a pipelined command language or other query language. As described herein, in some cases, the query system 114 can execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components can be used in the map and/or reduce functions of the query execution.

In some cases, as part of executing the query, the query system 114 can use one or more catalogs or databases to identify the set of data to be processed or its location in the storage system 116 and/or can retrieve data from the storage system 116. In addition, in some embodiments, the query system 114 can store some or all of the query results in the storage system 116.

In some cases, the storage system 116 may include one or more data stores associated with or coupled to the components of the indexing system 112 that are accessible via a system bus or local area network. In certain embodiments, the storage system 116 may be a shared storage system 116, like Amazon S3 or Google Cloud Storage, that are accessible via a wide area network.

As mentioned and as will be described in greater detail below, the storage system 116 can be made up of one or more data stores storing data that has been processed by the indexing system 112. In some cases, the storage system includes data stores of the components of the indexing system 112 and/or query system 114. In certain embodiments, the storage system 116 can be implemented as a shared storage system 116. The shared storage system 116 can be configured to provide high availability, highly resilient, low loss data storage. In some cases, to provide the high availability, highly resilient, low loss data storage, the shared storage system 116 can store multiple copies of the data in the same and different geographic locations and across different types of data stores (e.g., solid state, hard drive, tape, etc.). Further, as data is received at the shared storage system 116 it can be automatically replicated multiple times according to a replication factor to different data stores across the same and/or different geographic locations. In some embodiments, the shared storage system 116 can correspond to cloud storage, such as Amazon Simple Storage Service (S3) or Elastic Block Storage (EBS), Google Cloud Storage, Microsoft Azure Storage, etc.

In some embodiments, indexing system 112 can read to and write from the shared storage system 116. For example, the indexing system 112 can copy buckets of data from its local or shared data stores to the shared storage system 116. In certain embodiments, the query system 114 can read from, but cannot write to, the shared storage system 116. For example, the query system 114 can read the buckets of data stored in shared storage system 116 by the indexing system 112, but may not be able to copy buckets or other data to the shared storage system 116. In some embodiments, the intake system 110 does not have access to the shared storage system 116. However, in some embodiments, one or more components of the intake system 110 can write data to the shared storage system 116 that can be read by the indexing system 112.

As described herein, in some embodiments, data in the system 102 (e.g., in the data stores of the components of the indexing system 112, shared storage system 116, or search nodes of the query system 114) can be stored in one or more time series buckets. Each bucket can include raw machine data associated with a timestamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

The system 102 can include additional components that interact with any one or any combination of the intake system 110, indexing system 112, query system 114, and/or storage system 116. Such components may include, but are not limited to an authentication system, orchestration system, one or more catalogs or databases, a gateway, etc.

An authentication system can include one or more components to authenticate users to access, use, and/or configure the system 102. Similarly, the authentication system can be used to restrict what a particular user can do on the system 102 and/or what components or data a user can access, etc.

An orchestration system can include one or more components to manage and/or monitor the various components of the system 102. In some embodiments, the orchestration system can monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system can determine when to add components to or remove components from a particular system 110, 112, 114, 116 (e.g., based on usage, user/tenant requests, etc.). In embodiments where the system 102 is implemented in a shared computing resource environment, the orchestration system can facilitate the creation and/or destruction of isolated execution environments or instances of the components of the system 102, etc.

In certain embodiments, the system 102 can include various components that enable it to provide stateless services or enable it to recover from an unavailable or unresponsive component without data loss in a time efficient manner. For example, the system 102 can store contextual information about its various components in a distributed way such that if one of the components becomes unresponsive or unavailable, the system 102 can replace the unavailable component with a different component and provide the replacement component with the contextual information. In this way, the system 102 can quickly recover from an unresponsive or unavailable component while reducing or eliminating the loss of data that was being processed by the unavailable component.

In some embodiments, the system 102 can store the contextual information in a catalog, as described herein. In certain embodiments, the contextual information can correspond to information that the system 102 has determined or learned based on use. In some cases, the contextual information can be stored as annotations (manual annotations and/or system annotations), as described herein.

In certain embodiments, the system 102 can include an additional catalog that monitors the location and storage of data in the storage system 116 to facilitate efficient access of the data during search time. In certain embodiments, such a catalog may form part of the storage system 116.

In some embodiments, the system 102 can include a gateway or other mechanism to interact with external devices or to facilitate communications between components of the system 102. In some embodiments, the gateway can be implemented using an application programming interface (API). In certain embodiments, the gateway can be implemented using a representational state transfer API (REST API).

In some environments, a user of a system 102 may install and configure, on computing devices owned and operated by the user, one or more software applications that implement some or all of the components of the system 102. For example, with reference to FIG. 1, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain embodiments, one or more of the components of the system 102 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g., intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute can be shared by multiple customers or tenants as part of the shared computing resource environment. In addition, when implemented in a shared computing resource environment or as a cloud-based service, various components of the system 102 can be implemented using containerization or operating-system-level virtualization, or other virtualization technique. For example, one or more components of the intake system 110, indexing system 112, or query system 114 can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment can provide a number of benefits. In some cases, implementing the system 102 in a shared computing resource environment can make it easier to install, maintain, and update the components of the system 102. For example, rather than accessing designated hardware at a particular location to install or provide a component of the system 102, a component can be remotely instantiated or updated as desired. Similarly, implementing the system 102 in a shared computing resource environment or as a cloud-based service can make it easier to meet dynamic demand. For example, if the system 102 experiences significant load at indexing or search, additional compute resources can be deployed to process the additional data or queries. In an "on-premises" environment, this type of flexibility and scalability may not be possible or feasible.

In addition, by implementing the system 102 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 can be configured to process the data from one customer or tenant or from multiple customers or tenants. Even in cases where a separate component of a system 102 is used for each customer, the underlying hardware on which the components of the system 102 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the system 102 can maintain logical separation between tenant data. For example, the system 102 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the system 102 can maintain the mutual exclusivity and/or independence between tenant data even as the tenant data is being processed, stored, and searched by the same underlying hardware. In certain cases, to maintain the mutual exclusivity and/or independence between the data of different tenants, the system 102 can use tenant identifiers to uniquely identify data associated with different tenants.

In a shared computing resource environment, some components of the system 102 can be instantiated and designated for individual tenants and other components can be shared by multiple tenants. In certain embodiments, a separate intake system 110, indexing system 112, and query system 114 can be instantiated for each tenant, whereas the shared storage system 116 or other components (e.g., data store, metadata catalog, and/or acceleration data store, described below) can be shared by multiple tenants. In some such embodiments where components are shared by multiple tenants, the components can maintain separate directories for the different tenants to ensure their mutual exclusivity and/or independence from each other. Similarly, in some such embodiments, the system 102 can use different hosting computing systems or different isolated execution environments to process the data from the different tenants as part of the intake system 110, indexing system 112, and/or query system 114.

In some embodiments, individual components of the intake system 110, indexing system 112, and/or query system 114 may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In certain embodiments, an indexing system 112 (or certain components thereof) can be instantiated and designated for a particular tenant or shared by multiple tenants. In some embodiments where a separate indexing system 112 is instantiated and designated for each tenant, different resources can be reserved for different tenants. For example, Tenant A can be consistently allocated a minimum of four indexing nodes and Tenant B can be consistently allocated a minimum of two indexing nodes. In some such embodiments, the four indexing nodes can be reserved for Tenant A and the two indexing nodes can be reserved for Tenant B, even if Tenant A and Tenant B are not using the reserved indexing nodes.

In embodiments where an indexing system 112 is shared by multiple tenants, components of the indexing system 112 can be dynamically assigned to different tenants. For example, if Tenant A has greater indexing demands, additional indexing nodes can be instantiated or assigned to Tenant A's data. However, as the demand decreases, the indexing nodes can be reassigned to a different tenant, or terminated. Further, in some embodiments, a component of the indexing system 112 can concurrently process data from the different tenants.

In some embodiments, one instance of query system 114 may be shared by multiple tenants. In some such cases, the same search head can be used to process/execute queries for different tenants and/or the same search nodes can be used to execute query for different tenants. Further, in some such cases, different tenants can be allocated different amounts of compute resources. For example, Tenant A may be assigned more search heads or search nodes based on demand or based on a service level arrangement than another tenant. However, once a search is completed the search head and/or nodes assigned to Tenant A may be assigned to Tenant B, deactivated, or their resource may be re-allocated to other components of the system 102, etc.

In some cases, by sharing more components with different tenants, the functioning of the system 102 can be improved. For example, by sharing components across tenants, the system 102 can improve resource utilization thereby reducing the amount of resources allocated as a whole. For example, if four indexing nodes, two search heads, and four search nodes are reserved for each tenant then those compute resources are unavailable for use by other processes or tenants, even if they go unused. In contrast, by sharing the indexing nodes, search heads, and search nodes with different tenants and instantiating additional compute resources, the system 102 can use fewer resources overall while providing improved processing time for the tenants that are using the compute resources. For example, if tenant A is not using any search nodes 506 and tenant B has many searches running, the system 102 can use search nodes that would have been reserved for tenant A to service tenant B. In this way, the system 102 can decrease the number of compute resources used/reserved, while improving the search time for tenant B and improving compute resource utilization.

2.0. Data Ingestion, Indexing, and Storage

FIG. 2 is a flow diagram illustrating an embodiment of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104. For example, the intake system 110 may receive a data stream from a log file generated by an application server, from a stream of network data from a network device, or from any other source of data. Non-limiting examples of machine data that can be received by the intake system 110 is described herein with reference to FIG. 3A.

In some embodiments, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In one embodiment, the processing conducted by the intake system 110 may be used to indicate one or more metadata fields applicable to each message. For example, the intake system 110 may include metadata fields within the messages, or publish the messages to topics indicative of a metadata field.

These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain embodiments, the intake system 110 may perform additional operations, such as, but not limited to, identifying individual events within the data, determining timestamps for the data, further enriching the data, etc.

At block 204, the indexing system 112 generates events from the data. In some cases, as part of generating the events, the indexing system 112 can parse the data of the message. In some embodiments, the indexing system 112 can determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 can apply an inferred sourcetype definition to the data to create the events.

In addition, as part of generating events from the data, the indexing system 112 can determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 can also associate events with one or more metadata fields. In some embodiments, a timestamp may be included in the metadata fields. These metadata fields may include any number of "default fields" that are associated with all events, and may also include one or more custom fields as defined by a user. In certain embodiments, the default metadata fields associated with each event may include a host, source, and sourcetype field including or in addition to a field storing the timestamp.

In certain embodiments, the indexing system 112 can also apply one or more transformations to event data that is to be included in an event. For example, such transformations can include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 can group events. In some embodiments, the indexing system 112 can group events based on time. For example, events generated within a particular time period or events that have a time stamp within a particular time period can be grouped together to form a bucket. A non-limiting example of a bucket is described herein with reference to FIG. 3B.

In certain embodiments, multiple components of the indexing system, such as an indexing node, can concurrently generate events and buckets. Furthermore, each indexing node that generates and groups events can concurrently generate multiple buckets. For example, multiple processors of an indexing node can concurrently process data, generate events, and generate buckets. Further, multiple indexing nodes can concurrently generate events and buckets. As such, ingested data can be processed in a highly distributed manner.

In some embodiments, as part of grouping events together, the indexing system 112 can generate one or more inverted indexes for a particular group of events. A non-limiting example of an inverted index is described herein with reference to FIG. 3C. In certain embodiments, the inverted indexes can include location information for events of a bucket. For example, the events of a bucket may be compressed into one or more files to reduce their size. The inverted index can include location information indicating the particular file and/or location within a particular file of a particular event.

In certain embodiments, the inverted indexes may include keyword entries or entries for field values or field name-value pairs found in events. In some cases, a field name-value pair can include a pair of words connected by a symbol, such as an equals sign or colon. The entries can also include location information for events that include the keyword, field value, or field value pair. In this way, relevant events can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2." In certain embodiments, the indexing system can populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 can use the sourcetype of the event to determine which regex to use for identifying field values.

Figure 3C:
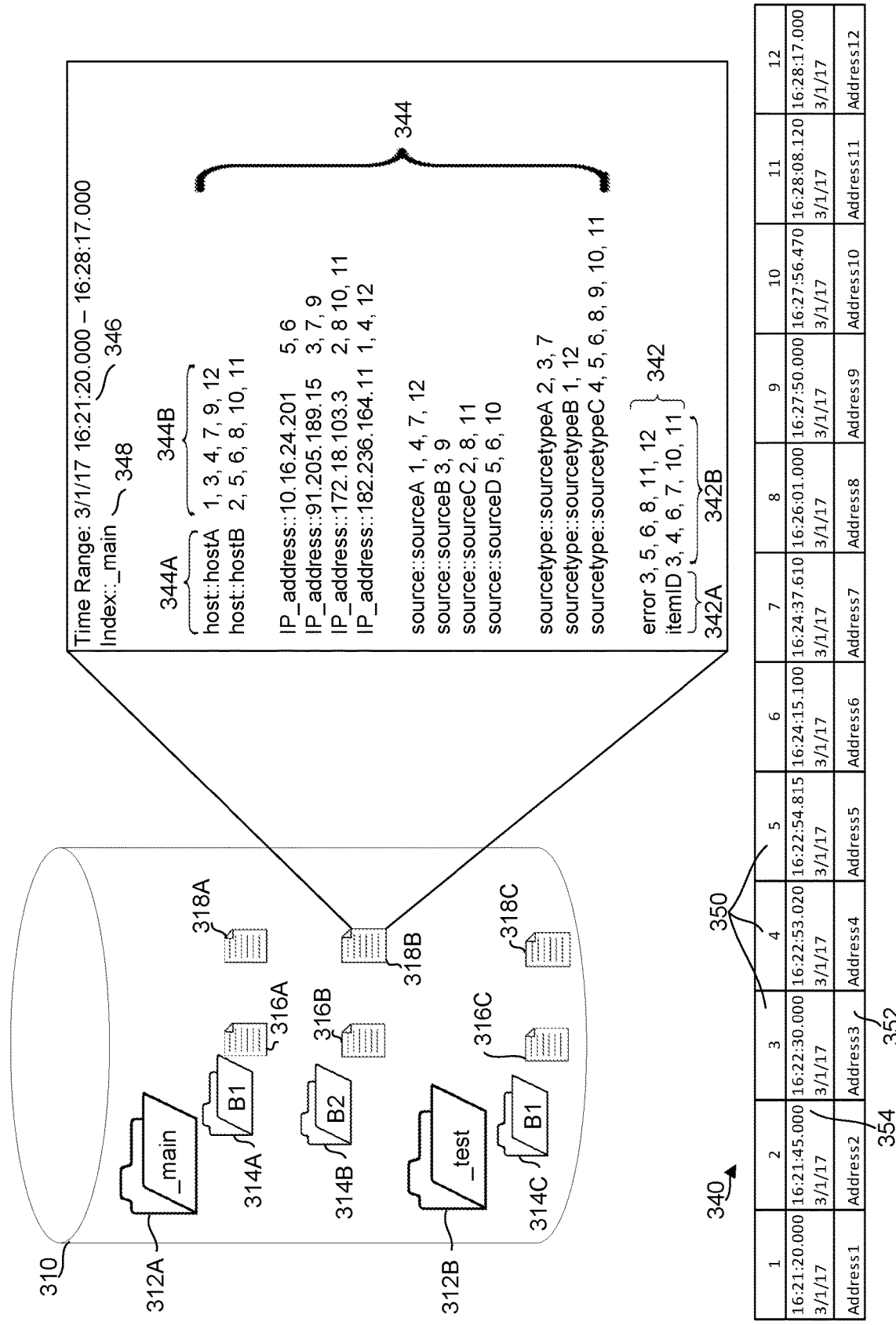

At block 208, the indexing system 112 stores the events with an associated timestamp in the storage system 116, which may be in a local data store and/or in a shared storage system. Timestamps enable a user to search for events based on a time range. In some embodiments, the stored events are organized into "buckets," where each bucket stores events associated with a specific time range based on the timestamps associated with each event. As mentioned, FIGS. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 112 may be responsible for storing the events in the storage system 116. As mentioned, the events or buckets can be stored locally on a component of the indexing system 112 or in a shared storage system 116. In certain embodiments, the component that generates the events and/or stores the events (indexing node) can also be assigned to search the events. In some embodiments separate components can be used for generating and storing events (indexing node) and for searching the events (search node).

By storing events in a distributed manner (either by storing the events at different components or in a shared storage system 116), the query system 114 can analyze events for a query in parallel. For example, using map-reduce techniques, multiple components of the query system (e.g., indexing or search nodes) can concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In embodiments where components of the indexing system 112 store buckets locally, the components can include a home directory and a cold directory. The home directory can store hot buckets and warm buckets, and the cold directory stores cold buckets. A hot bucket can refer to a bucket that is capable of receiving and storing additional events. A warm bucket can refer to a bucket that can no longer receive events for storage, but has not yet been moved to the cold directory. A cold bucket can refer to a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, components of the indexing system may store old, archived data in a frozen bucket that is not capable of being searched at search time. In some embodiments, a frozen bucket may be stored in slower and/or larger memory, such as a hard disk, and may be stored in offline and/or remote storage.

In some embodiments, components of the indexing system 112 may not include a cold directory and/or cold or frozen buckets. For example, in embodiments where buckets are copied to a shared storage system 116 and searched by separate components of the query system 114, buckets can be deleted from components of the indexing system as they are stored to the storage system 116. In certain embodiments, the shared storage system 116 may include a home directory that includes warm buckets copied from the indexing system 112 and a cold directory of cold or frozen buckets as described above.

FIG. 3A is a block diagram illustrating an embodiment of machine data received by the system 102. The machine data can correspond to data from one or more host devices 104 or data sources. As mentioned, the data source can correspond to a log file, data stream or other data structure that is accessible by a host device 104. In the illustrated embodiment of FIG. 3A, the machine data has different forms. For example, the machine data 302 may be log data that is unstructured or that does not have any clear structure or fields, and include different portions 302A-302E that correspond to different entries of the log and that separated by boundaries. Such data may also be referred to as raw machine data.

The machine data 304 may be referred to as structured or semi-structured machine data as it does include some data in a JavaScript Object Notation (JSON) structure defining certain field and field values (e.g., machine data 304A showing field name:field values container name:kube-api-server, host:ip 172 20 43 173.ec2.internal, pod_id: 0a73017b-4efa-11e8-a4e1-0a2bf2ab4bba, etc.), but other parts of the machine data 304 is unstructured or raw machine data (e.g., machine data 304B). The machine data 306 may be referred to as structured data as it includes particular rows and columns of data with field names and field values.

In some embodiments, the machine data 302 can correspond to log data generated by a host device 104 configured as an Apache server, the machine data 304 can correspond to log data generated by a host device 104 in a shared computing resource environment, and the machine data 306 can correspond to metrics data. Given the differences between host devices 104 that generated the log data 302, 304, the form of the log data 302, 304 is different. In addition, as the log data 304 is from a host device 104 in a shared computing resource environment, it can include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes can be received separately and/or found in different data sources and/or host devices 104.

As described herein, the system 102 can process the machine data based on the form in which it is received. In some cases, the intake system 110 can utilize one or more rules to process the data. In certain embodiments, the intake system 110 can enrich the received data. For example, the intake system may add one or more fields to the data received from the host devices 104, such as fields denoting the host, source, sourcetype, index, or tenant associated with the incoming data. In certain embodiments, the intake system 110 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system 110 can be communicated or made available to the indexing system 112, the query system 114, and/or to other systems. In some embodiments, the intake system 110 communicates or makes available streams of data using one or more shards. For example, the indexing system 112 may read or receive data from one shard and another system may receive data from another shard. As another example, multiple systems may receive data from the same shard.

As used herein, a partition can refer to a logical division of data. In some cases, the logical division of data may refer to a portion of a data stream, such as a shard from the intake system 110. In certain cases, the logical division of data can refer to an index or other portion of data stored in the storage system 116, such as different directories or file structures used to store data or buckets. Accordingly, it will be understood that the logical division of data referenced by the term partition will be understood based on the context of its use.

FIGS. 3B and 3C are block diagrams illustrating embodiments of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustrative and is not intended to limit the data format in which the machine data and metadata is stored in various embodiments described herein. In one particular embodiment, machine data can be stored in a compressed or encrypted format. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

In the illustrated embodiment of FIG. 3B the data store 310 includes a directory 312 (individually referred to as 312A, 312B) for each index (or partition) that contains a portion of data stored in the data store 310 and a sub-directory 314 (individually referred to as 314A, 314B, 314C) for one or more buckets of the index. In the illustrated embodiment of FIG. 3B, each sub-directory 314 corresponds to a bucket and includes an event data file 316 (individually referred to as 316A, 316B, 316C) and an inverted index 318 (individually referred to as 318A, 318B, 318C). However, it will be understood that each bucket can be associated with fewer or more files and each sub-directory 314 can store fewer or more files.

In the illustrated embodiment, the data store 310 includes a main directory 312A associated with an index "_main" and a _test directory 312B associated with an index "_test." However, the data store 310 can include fewer or more directories. In some embodiments, multiple indexes can share a single directory or all indexes can share a common directory. Additionally, although illustrated as a single data store 310, it will be understood that the data store 310 can be implemented as multiple data stores storing different portions of the information shown in FIG. 3C. For example, a single index can span multiple directories or multiple data stores.

Furthermore, although not illustrated in FIG. 3B, it will be understood that, in some embodiments, the data store 310 can include directories for each tenant and sub-directories for each index of each tenant, or vice versa. Accordingly, the directories 312A and 312B can, in certain embodiments, correspond to sub-directories of a tenant or include sub-directories for different tenants.

In the illustrated embodiment of FIG. 3B, two sub-directories 314A, 314B of the _main directory 312A and one sub-directory 312C of the _test directory 312B are shown. The sub-directories 314A, 314B, 314C can correspond to buckets of the indexes associated with the directories 312A, 312B. For example, the sub-directories 314A and 314B can correspond to buckets "B1" and "B2," respectively, of the index "_main" and the sub-directory 314C can correspond to bucket "B1" of the index "_test." Accordingly, even though there are two "B1" buckets shown, as each "B1" bucket is associated with a different index (and corresponding directory 312), the system 102 can uniquely identify them.

Although illustrated as buckets "B1" and "B2," it will be understood that the buckets (and/or corresponding sub-directories 314) can be named in a variety of ways. In certain embodiments, the bucket (or sub-directory) names can include information about the bucket. For example, the bucket name can include the name of the index with which the bucket is associated, a time range of the bucket, etc.

As described herein, each bucket can have one or more files associated with it, including, but not limited to one or more raw machine data files, bucket summary files, filter files, inverted indexes (also referred to herein as high performance indexes or keyword indexes), permissions files, configuration files, etc. In the illustrated embodiment of FIG. 3B, the files associated with a particular bucket can be stored in the sub-directory corresponding to the particular bucket. Accordingly, the files stored in the sub-directory 314A can correspond to or be associated with bucket "B1," of index "_main," the files stored in the sub-directory 314B can correspond to or be associated with bucket "B2" of index "_main," and the files stored in the sub-directory 314C can correspond to or be associated with bucket "B1" of index "test."

FIG. 3B further illustrates an expanded event data file 316C showing an example of data that can be stored therein. In the illustrated embodiment, four events 320, 322, 324, 326 of the machine data file 316C are shown in four rows. Each event 320-326 includes machine data 330 and a timestamp 332. The machine data 330 can correspond to the machine data received by the system 102. For example, in the illustrated embodiment, the machine data 330 of events 320, 322, 324, 326 corresponds to portions 302A, 302B, 302C, 302D, respectively, of the machine data 302 after it was processed by the indexing system 112.

Metadata 334-338 associated with the events 320-326 is also shown in the table 319. In the illustrated embodiment, the metadata 334-338 includes information about a host 334, source 336, and sourcetype 338 associated with the events 320-326. Any of the metadata can be extracted from the corresponding machine data, or supplied or defined by an entity, such as a user or computer system. The metadata fields 334-338 can become part of, stored with, or otherwise associated with the events 320-326. In certain embodiments, the metadata 334-338 can be stored in a separate file of the sub-directory 314C and associated with the machine data file 316C. In some cases, while the timestamp 332 can be extracted from the raw data of each event, the values for the other metadata fields may be determined by the indexing system 112 based on information it receives pertaining to the host device 104 or data source of the data separate from the machine data.

While certain default or user-defined metadata fields can be extracted from the machine data for indexing purposes, the machine data within an event can be maintained in its original condition. As such, in embodiments in which the portion of machine data included in an event is unprocessed or otherwise unaltered, it is referred to herein as a portion of raw machine data. For example, in the illustrated embodiment, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various fields.

In other embodiments, the portion of machine data in an event can be processed or otherwise altered relative to the machine data used to create the event. With reference to the machine data 304, the machine data of a corresponding event (or events) may be modified such that only a portion of the machine data 304 is stored as one or more events. For example, in some cases, only machine data 304B of the machine data 304 may be retained as one or more events or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. In the illustrated embodiments of FIGS. 3A, 3B, all the raw machine data retrieved from the server access log is retained and stored as part of the corresponding events 320-324 in the file 316C.

Event 326 is associated with an entry in a server error log, as indicated by "error.log" in the source column 336 that records errors that the server encountered when processing a client request. Similar to the events related to the server access log, all the raw machine data in the error log file pertaining to event 326 can be preserved and stored as part of the event 326.

Saving minimally processed or unprocessed machine data in a data store associated with metadata fields in the manner similar to that shown in FIG. 3B is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

FIG. 3C illustrates an embodiment of another file that can be included in one or more subdirectories 314 or buckets. Specifically, FIG. 3C illustrates an exploded view of an embodiments of an inverted index 318B in the sub-directory 314B, associated with bucket "B2" of the index "_main," as well as an event reference array 340 associated with the inverted index 318B.

In some embodiments, the inverted indexes 318 can correspond to distinct time-series buckets. As such, each inverted index 318 can correspond to a particular range of time for an index. In the illustrated embodiment of FIG. 3C, the inverted indexes 318A, 318B correspond to the buckets "B1" and "B2," respectively, of the index "_main," and the inverted index 318C corresponds to the bucket "B1" of the index "_test." In some embodiments, an inverted index 318 can correspond to multiple time-series buckets (e.g., include information related to multiple buckets) or inverted indexes 318 can correspond to a single time-series bucket.

Each inverted index 318 can include one or more entries, such as keyword (or token) entries 342 or field-value pair entries 344. Furthermore, in certain embodiments, the inverted indexes 318 can include additional information, such as a time range 346 associated with the inverted index or an index identifier 348 identifying the index associated with the inverted index 318. It will be understood that each inverted index 318 can include less or more information than depicted. For example, in some cases, the inverted indexes 318 may omit a time range 346 and/or index identifier 348. In some such embodiments, the index associated with the inverted index 318 can be determined based on the location (e.g., directory 312) of the inverted index 318 and/or the time range of the inverted index 318 can be determined based on the name of the sub-directory 314.

Token entries, such as token entries 342 illustrated in inverted index 318B, can include a token 342A (e.g., "error," "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated embodiment of FIG. 3C, the error token entry includes the identifiers 3, 5, 6, 8, 11, and 12 corresponding to events located in the bucket "B2" of the index "_main."

In some cases, some token entries can be default entries, automatically determined entries, or user specified entries. In some embodiments, the indexing system 112 can identify each word or string in an event as a distinct token and generate a token entry for the identified word or string. In some cases, the indexing system 112 can identify the beginning and ending of tokens based on punctuation, spaces, etc. In certain cases, the indexing system 112 can rely on user input or a configuration file to identify tokens for token entries 342, etc. It will be understood that any combination of token entries can be included as a default, automatically determined, or included based on user-specified criteria.

Similarly, field-value pair entries, such as field-value pair entries 344 shown in inverted index 318B, can include a field-value pair 344A and event references 344B indicative of events that include a field value that corresponds to the field-value pair (or the field-value pair). For example, for a field-value pair sourcetype::sendmail, a field-value pair entry 344 can include the field-value pair "sourcetype:: sendmail" and a unique identifier, or event reference, for each event stored in the corresponding time-series bucket that includes a sourcetype "sendmail."

In some cases, the field-value pair entries 344 can be default entries, automatically determined entries, or user specified entries. As a non-limiting example, the field-value pair entries for the fields "host," "source," and "sourcetype" can be included in the inverted indexes 318 as a default. As such, all of the inverted indexes 318 can include field-value pair entries for the fields "host," "source," and "sourcetype." As yet another non-limiting example, the field-value pair entries for the field "IP_address" can be user specified and may only appear in the inverted index 318B or the inverted indexes 318A, 318B of the index "_main" based on user-specified criteria. As another non-limiting example, as the indexing system 112 indexes the events, it can automatically identify field-value pairs and create field-value pair entries 344. For example, based on the indexing system's 212 review of events, it can identify IP_address as a field in each event and add the IP_address field-value pair entries to the inverted index 318B (e.g., based on punctuation, like two keywords separated by an '=' or ':' etc.). It will be understood that any combination of field-value pair entries can be included as a default, automatically determined, or included based on user-specified criteria.

With reference to the event reference array 340, each unique identifier 350, or event reference, can correspond to a unique event located in the time series bucket or machine data file 316B. The same event reference can be located in multiple entries of an inverted index 318. For example if an event has a sourcetype "splunkd," host "www1" and token "warning," then the unique identifier for the event can appear in the field-value pair entries 344 "sourcetype:: splunkd" and "host::www1," as well as the token entry "warning." With reference to the illustrated embodiment of FIG. 3C and the event that corresponds to the event reference 3, the event reference 3 is found in the field-value pair entries 344 "host::hostA,", "source::sourceB," "sourcetype:: sourcetypeA," "sourcetype::sourcetypeA," and "IP_address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 3C, since the event reference 7 appears in the field-value pair entry "sourcetype::sourcetypeA," then it does not appear in the other field-value pair entries for the sourcetype field, including "sourcetype::sourcetypeB," "sourcetype::sourcetypeC," and "sourcetype::sourcetypeD."

The event references 350 can be used to locate the events in the corresponding bucket or machine data file 316. For example, the inverted index 318B can include, or be associated with, an event reference array 340. The event reference array 340 can include an array entry 350 for each event reference in the inverted index 318B. Each array entry 350 can include location information 352 of the event corresponding to the unique identifier (non-limiting example: seek address of the event, physical address, slice ID, etc.), a timestamp 354 associated with the event, or additional information regarding the event associated with the event reference, etc.

For each token entry 342 or field-value pair entry 344, the event reference 342B, 344B, respectively, or unique identifiers can be listed in chronological order or the value of the event reference can be assigned based on chronological data, such as a timestamp associated with the event referenced by the event reference. For example, the event reference 1 in the illustrated embodiment of FIG. 3C can correspond to the first-in-time event for the bucket, and the event reference 12 can correspond to the last-in-time event for the bucket. However, the event references can be listed in any order, such as reverse chronological order, ascending order, descending order, or some other order (e.g., based on time received or added to the machine data file), etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 3C, the entries are sorted first by entry type and then alphabetically.

In some cases, inverted indexes 318 can decrease the search time of a query. For example, for a statistical query, by using the inverted index, the system 102 can avoid the computational overhead of parsing individual events in a machine data file 316. Instead, the system 102 can use the inverted index 318 separate from the raw record data store to generate responses to the received queries.

3.0. Query Processing and Execution

Figure 4A:
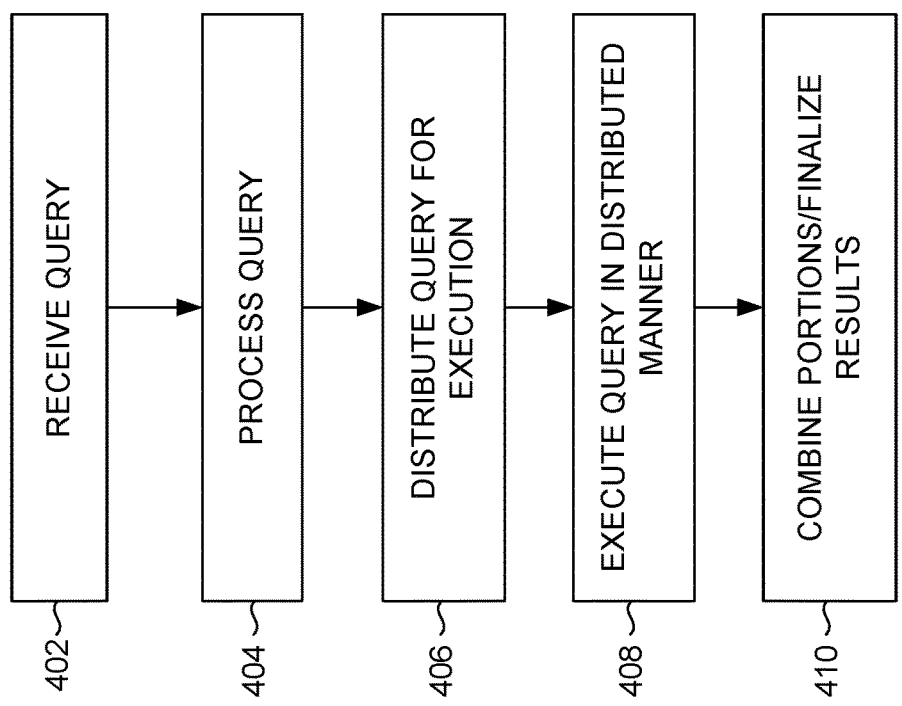
FIG. 4A is a flow diagram illustrating an embodiment of a routine implemented by the query system to execute a query.

FIG. 4A is a flow diagram illustrating an embodiment of a routine implemented by the query system 114 for executing a query. At block 402, the query system 114 receives a search query. As described herein, the query can be in the form of a pipelined command language or other query language and include filter criteria used to identify a set of data and processing criteria used to process the set of data.

At block 404, the query system 114 processes the query. As part of processing the query, the query system 114 can determine whether the query was submitted by an authenticated user and/or review the query to determine that it is in a proper format for the data intake and query system 102, has correct semantics and syntax, etc. In addition, the query system 114 can determine what, if any, configuration files or other configurations to use as part of the query.

In addition as part of processing the query, the query system 114 can determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 can generate specific commands, for the components that are to execute the query. This may include generating subqueries, partial queries or different phases of the query for execution by different components of the query system 114. In some cases, the query system 114 can use map-reduce techniques to determine how to map the data for the search and then reduce the data. Based on the map-reduce phases, the query system 114 can generate query commands for different components of the query system 114.

As part of processing the query, the query system 114 can determine where to obtain the data. For example, in some cases, the data may reside on one or more indexing nodes or search nodes, as part of the storage system 116 or may reside in a shared storage system or a system external to the system 102. In some cases, the query system 114 can determine what components to use to obtain and process the data. For example, the query system 114 can identify search nodes that are available for the query, etc.

At block 406, the query system 1206 distributes the determined portions or phases of the query to the appropriate components (e.g., search nodes). In some cases, the query system 1206 can use a catalog to determine which components to use to execute the query (e.g., which components include relevant data and/or are available, etc.).

At block 408, the components assigned to execute the query, execute the query. As mentioned, different components may execute different portions of the query. In some cases, multiple components (e.g., multiple search nodes) may execute respective portions of the query concurrently and communicate results of their portion of the query to another component (e.g., search head). As part of the identifying the set of data or applying the filter criteria, the components of the query system 114 can search for events that match the criteria specified in the query. These criteria can include matching keywords or specific values for certain fields. The searching operations at block 408 may use the late-binding schema to extract values for specified fields from events at the time the query is processed. In some embodiments, one or more rules for extracting field values may be specified as part of a sourcetype definition in a configuration file or in the query itself. In certain embodiments where search nodes are used to obtain the set of data, the search nodes can send the relevant events back to the search head, or use the events to determine a partial result, and send the partial result back to the search head.

At block 410, the query system 114 combines the partial results and/or events to produce a final result for the query. As mentioned, in some cases, combining the partial results and/or finalizing the results can include further processing the data according to the query. Such processing may entail joining different set of data, transforming the data, and/or performing one or more mathematical operations on the data, preparing the results for display, etc.

In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the query system 114 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring to the search jobs.

The query system 114 can also perform various operations to make the search more efficient. For example, before the query system 114 begins execution of a query, it can determine a time range for the query and a set of common keywords that all matching events include. The query system 114 may then use these parameters to obtain a superset of the eventual results. Then, during a filtering stage, the query system 114 can perform field-extraction operations on the superset to produce a reduced set of search results. This speeds up queries, which may be particularly helpful for queries that are performed on a periodic basis. In some cases, to make the search more efficient, the query system 114 can use information known about certain data sets that are part of the query to filter other data sets. For example, if an early part of the query includes instructions to obtain data with a particular field, but later commands of the query do not rely on the data with that particular field, the query system 114 can omit the superfluous part of the query from execution.

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can include filter criteria used to search or filter for specific data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|." In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms or filter criteria at the beginning of the pipeline. Such search terms or filter criteria can include any combination of keywords, phrases, times, dates, Boolean expressions, fieldname-field value pairs, etc. that specify which results should be obtained from different locations. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field criteria. For example, a search command can filter events based on the word "warning" or filter events based on a field value "10.0.1.2" associated with a field "clientip."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns can contain basic information about the data and/or data that has been dynamically extracted at search time.

Figure 4B:
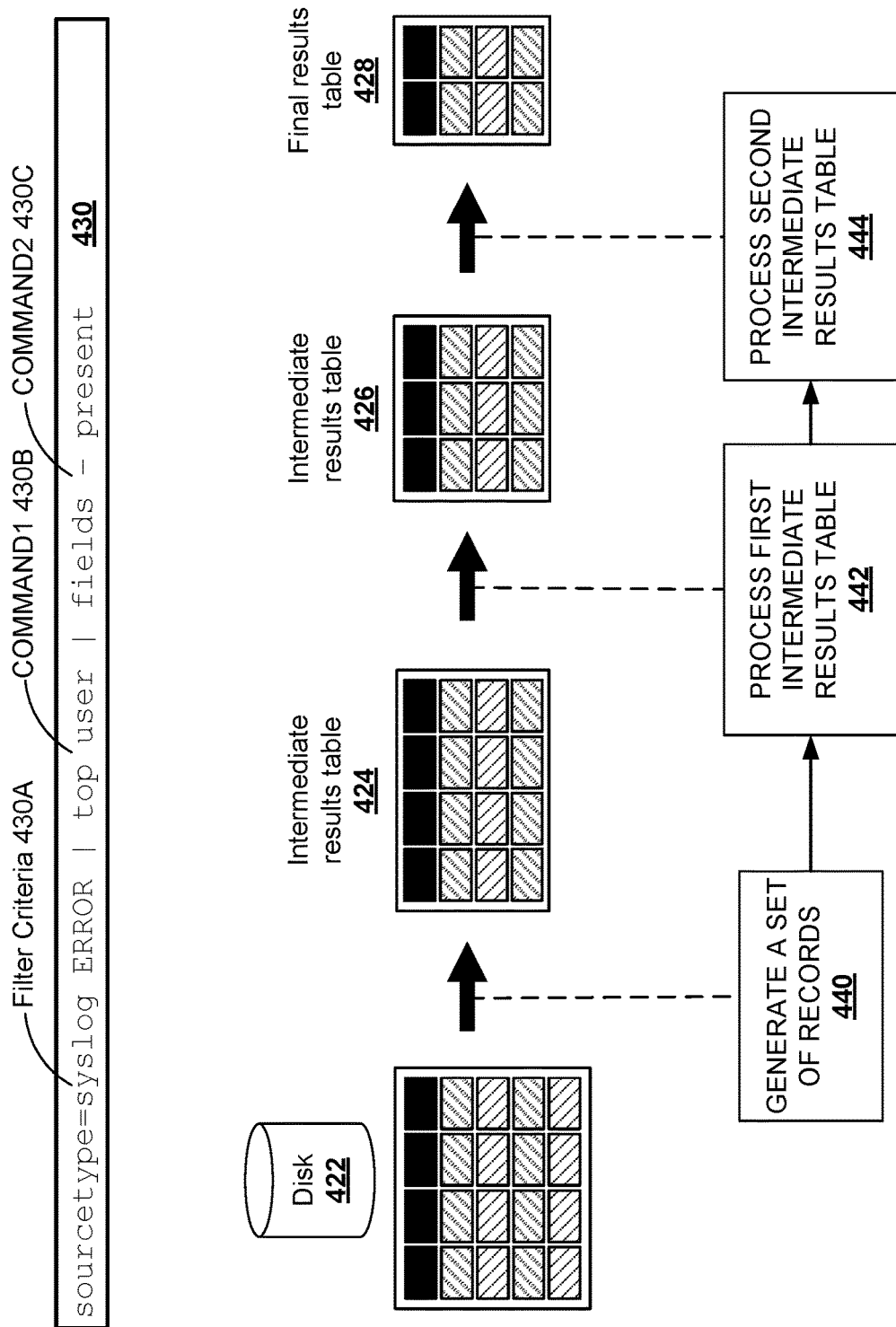
FIG. 4B provides a visual representation of the manner in which a pipelined command language or query can operate.

FIG. 4B provides a visual representation of the manner in which a pipelined command language or query can operate in accordance with the disclosed embodiments. The query 430 can be input by the user and submitted to the query system 114. In the illustrated embodiment, the query 430 comprises filter criteria 430A, followed by two commands 430B, 430C (namely, Command1 and Command2). Disk 422 represents data as it is stored in a data store to be searched. For example, disk 422 can represent a portion of the storage system 116 or some other data store that can be searched by the query system 114. Individual rows of can represent different events and columns can represent different fields for the different events. In some cases, these fields can include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 can execute the filter criteria 430A portion of the query 430 before executing Command1 or Command2.

Rows in the table 424 may represent individual records, where each record corresponds to an event in the disk 422 that satisfied the filter criteria. Columns in the table 424 may correspond to different fields of an event or record, such as "user," "count," percentage," "timestamp," or the raw machine data of an event, etc. Notably, the fields in the intermediate results table 424 may differ from the fields of the events on the disk 422. In some cases, this may be due to the late binding schema described herein that can be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 matched the filter criteria 430A "sourcetype=syslog ERROR." In some embodiments, instead of searching individual events or raw machine data, the set of events in the intermediate results table 424 may be generated by a call to a pre-existing inverted index.

At block 442, the query system 114 processes the events of the first intermediate results table 424 to generate the second intermediate results table 426. With reference to the query 430, the query system 114 processes the events of the first intermediate results table 424 to identify the top users according to Command1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 can represent a record that includes a unique field value for the field "user," and each column can represent a field for that record, such as fields "user," "count," and "percentage."

At block 444, the query system 114 processes the second intermediate results table 426 to generate the final results table 428. With reference to query 430, the query system 114 applies the command "fields—present" to the second intermediate results table 426 to generate the final results table 428. As shown, the command "fields—present" of the query 430 results in one less column, which may represent that a field was removed during processing. For example, the query system 114 may have determined that the field "percentage" was unnecessary for displaying the results based on the Command2. In such a scenario, each record of the final results table 428 would include a field "user," and "count." Further, the records in the table 428 would be ordered from largest count to smallest count based on the query commands.

It will be understood that the final results table 428 can be a third intermediate results table, which can be pipelined to another stage where further filtering or processing of the data can be performed, e.g., preparing the data for display purposes, filtering the data based on a condition, performing a mathematical calculation with the data, etc. In different embodiments, other query languages, such as the Structured Query Language ("SQL"), can be used to create a query.

As described herein, extraction rules can be used to extract field-value pairs or field values from data. An extraction rule can comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules can be used to extract one or more values for a field from events by parsing the portions of machine data in the events and examining the data for one or more patterns of characters, numbers, delimiters, etc., that indicate where the field begins and, optionally, ends. In certain embodiments, extraction rules can be stored in one or more configuration files. In some cases, a query itself can specify one or more extraction rules.

In some cases, extraction rules can be applied at data ingest by the intake system 110 and/or indexing system 112. For example, the intake system 110 and indexing system 112 can apply extraction rules to ingested data and/or events generated from the ingested data and store results in an inverted index.

The system 102 advantageously allows for search time field extraction. In other words, fields can be extracted from the event data at search time using late-binding schema as opposed to at data ingestion time, which was a major limitation of the prior art systems. Accordingly, extraction rules can be applied at search time by the query system 114. The query system can apply extraction rules to events retrieved from the storage system 116 or data received from sources external to the system 102. Extraction rules can be applied to all the events in the storage system 116 or to a subset of the events that have been filtered based on some filter criteria (e.g., event timestamp values, etc.).

Figure 4C:
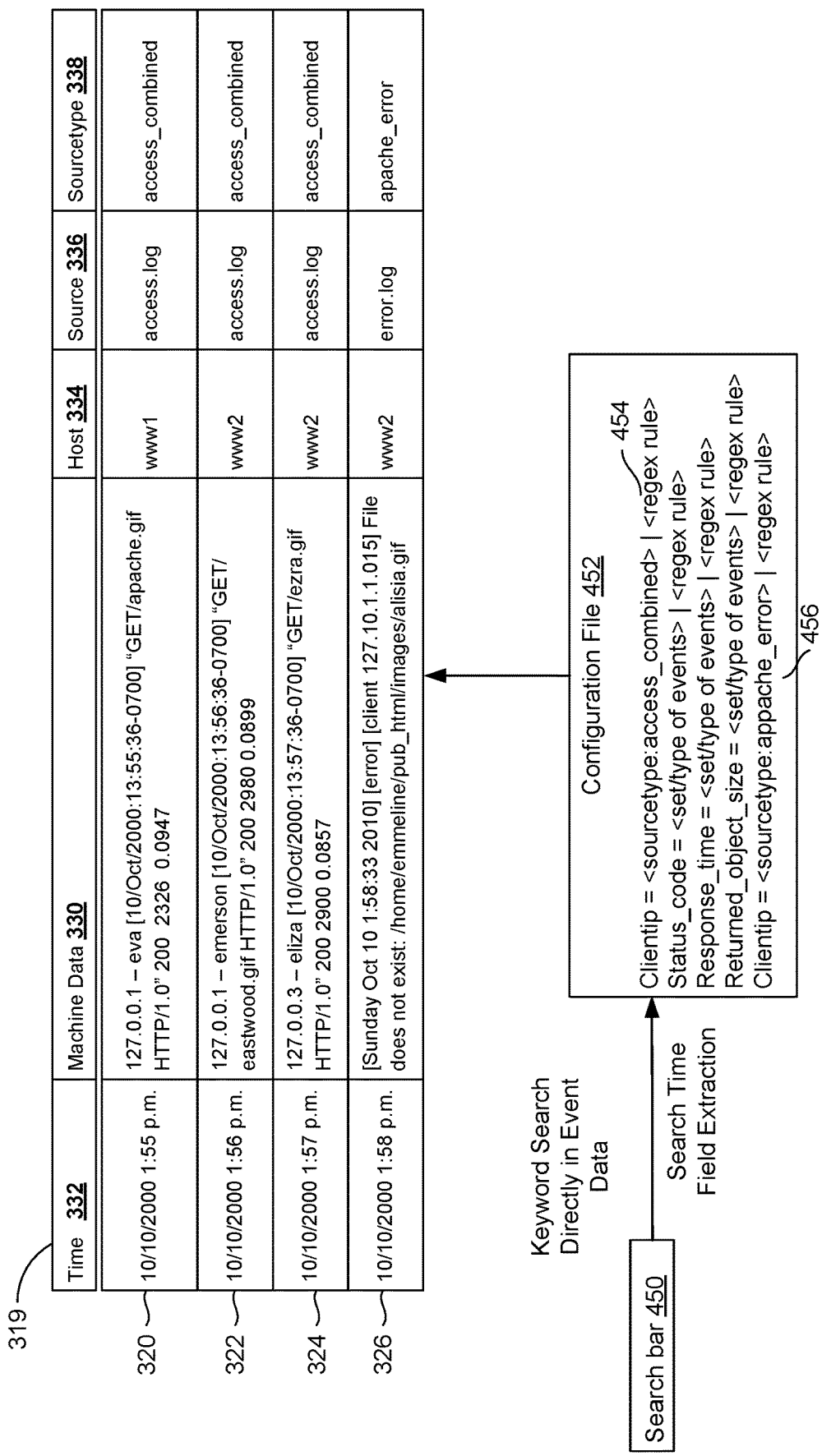
FIG. 4C is a block diagram illustrating an embodiment of a configuration file that includes various extraction rules that can be applied to events.

FIG. 4C is a block diagram illustrating an embodiment of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store can store millions of events. FIG. 4C also illustrates an embodiment of a search bar 450 for entering a query and a configuration file 452 that includes various extraction rules that can be applied to the events 320-326.

As a non-limiting example, if a user inputs a query into search bar 450 that includes only keywords (also known as "tokens"), e.g., the keyword "error" or "warning," the query system 114 can search for those keywords directly in the events 320-326 stored in the raw record data store.

As described herein, the indexing system 112 can optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 can search the events 320-326 directly and return the first event 320. In the case where the keyword has been indexed, the inverted index can include a reference pointer that will allow for a more efficient retrieval of the event data from the data store. If the keyword has not been indexed, the query system 114 can search through the events in the event data file to service the search.

In many cases, a query include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 evaemerson."

FIG. 4C illustrates the manner in which configuration files may be used to configure custom fields at search time in accordance with the disclosed embodiments. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more embodiments, locate configuration file 452 during the execution of the query.

Configuration file 452 may contain extraction rules for various fields, e.g., the "clientip" field. The extraction rules may be inserted into the configuration file 452 in a variety of ways. In some embodiments, the extraction rules can comprise regular expression rules that are manually entered in by the user.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 452.

In some embodiments, the indexing system 112 can automatically discover certain custom fields at index time and the regular expressions for those fields will be automatically generated at index time and stored as part of extraction rules in configuration file 452. For example, fields that appear in the event data as "key=value" pairs may be automatically extracted as part of an automatic field discovery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324. Furthermore, certain events may not contain a particular field at all. To address the discrepancies in the format and content of the different types of events, the configuration file 452 can specify the set of events to which an extraction rule applies. For example, extraction rule 454 specifies that it is to be used with events having a sourcetype "access_combined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events can have its own corresponding extraction rule in the configuration file 452 and each of the extraction rules would comprise a different regular expression to parse out the associated field value. In some cases, the sets of events are grouped by sourcetype because events generated by a particular source can have the same format.

The field extraction rules stored in configuration file 452 can be used to perform search-time field extractions. For example, for a query that requests a list of events with sourcetype "access_combined" where the "clientip" field equals "127.0.0.1," the query system 114 can locate the configuration file 452 to retrieve extraction rule 454 that allows it to extract values associated with the "clientip" field from the events where the sourcetype is "access_combined" (e.g., events 320-324). After the "clientip" field has been extracted from the events 320, 322, 324, the query system 114 can then apply the field criteria by performing a compare operation to filter out events where the "clientip" field does not equal "127.0.0.1." In the example shown in FIG. 4C, the events 320 and 322 would be returned in response to the user query. In this manner, the query system 114 can service queries with filter criteria containing field criteria and/or keyword criteria.

It should also be noted that any events filtered by performing a search-time field extraction using a configuration file 452 can be further processed by directing the results of the filtering step to a processing step using a pipelined search language. Using the prior example, a user can pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field searchable. In other words, the raw record data store can be searched using keywords as well as fields, wherein the fields are searchable name/value pairings that can distinguish one event from another event and can be defined in configuration file 452 using extraction rules. In comparison to a search containing field names, a keyword search may result in a search of the event data directly without the use of a configuration file.

Further, the ability to add schema to the configuration file 452 at search time results in increased efficiency and flexibility. A user can create new fields at search time and simply add field definitions to the configuration file 452. As a user learns more about the data in the events, the user can continue to refine the late-binding schema by adding new fields, deleting fields, or modifying the field extraction rules in the configuration file for use the next time the schema is used by the system 102. Because the system 102 maintains the underlying raw data and uses late-binding schema for searching the raw data, it enables a user to continue investigating and learn valuable insights about the raw data long after data ingestion time. Similarly, multiple field definitions can be added to the configuration file to capture the same field across events generated by different sources or sourcetypes. This allows the system 102 to search and correlate data across heterogeneous sources flexibly and efficiently.

The system 102 can use one or more data models to search and/or better understand data. A data model is a hierarchically structured search-time mapping of semantic knowledge about one or more datasets. It encodes the domain knowledge used to build a variety of specialized searches of those datasets. Those searches, in turn, can be used to generate reports.

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

Performing extraction and analysis operations at search time can involve a large amount of data and require a large number of computational operations, which can cause delays in processing the queries. In some embodiments, the system 102 can employ a number of unique acceleration techniques to speed up analysis operations performed at search time. These techniques include: performing search operations in parallel using multiple components of the query system 114, using an inverted index 118, and accelerating the process of generating reports.

To facilitate faster query processing, a query can be structured such that multiple components of the query system 114 (e.g., search nodes) perform the query in parallel, while aggregation of search results from the multiple components is performed at a particular component (e.g., search head). For example, consider a scenario in which a user enters the query "Search "error" | stats count BY host." The query system 114 can identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 can generate commands to be executed in parallel by the search nodes, with each search node applying the generated commands to a subset of the data to be searched. In this example, the query system 114 generates and then distributes the following commands to the individual search nodes: "Search "error" | prestats count BY host." In this example, the "prestats" command can indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 can employ a variety of techniques to use distributed components to execute a query. In some embodiments, the query system 114 can use distributed components for only mapping functions of a query (e.g., gather data, applying filter criteria, etc.). In certain embodiments, the query system 114 can use distributed components for mapping and reducing functions (e.g., joining data, combining data, reducing data, etc.) of a query.

4.0. Example Use Cases

The system 102 provides various schemas, dashboards, and visualizations that simplify developers' tasks to create applications with additional capabilities, including but not limited to security, data center monitoring, IT service monitoring, and client/customer insights.

An embodiment of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system 102 searching and reporting capabilities, the enterprise security application provides a top-down and bottom-up view of an organization's security posture.

An embodiment of an IT monitoring application is SPLUNK® IT SERVICE INTELLIGENCE™, which performs monitoring and alerting operations. The IT monitoring application also includes analytics to help an analyst diagnose the root cause of performance problems based on large volumes of data stored by the system 102 as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

As described herein, the system 102 can receive heterogeneous data from disparate systems. In some cases, the data from the disparate systems may be related and correlating the data can result in insights into client or customer interactions with various systems of a vendor. To aid in the correlation of data across different systems, multiple field definitions can be added to one or more configuration files to capture the same field or data across events generated by different sources or sourcetypes. This can enable the system 102 to search and correlate data across heterogeneous sources flexibly and efficiently.

Figure 4D:
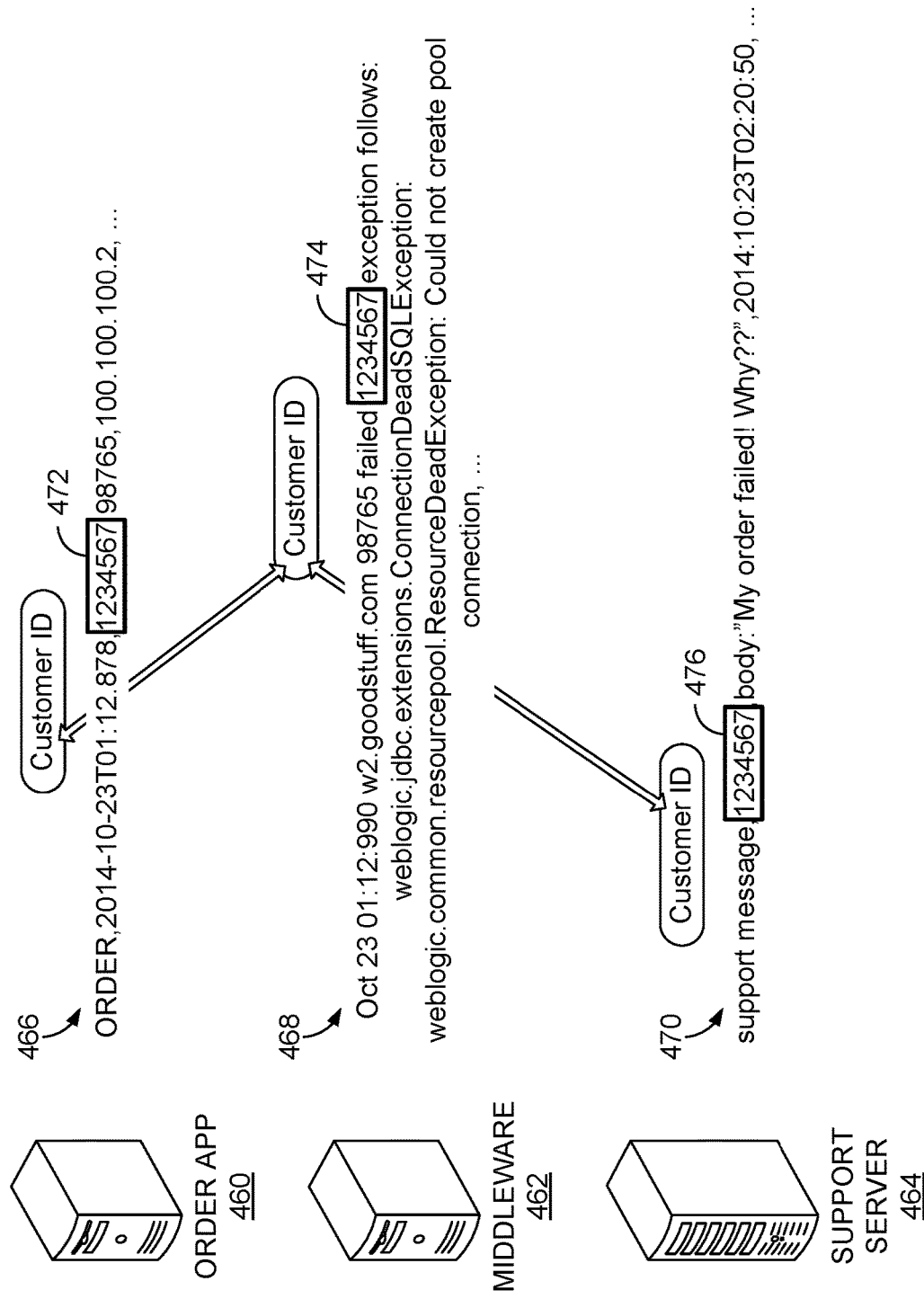
FIG. 4D is a block diagram illustrating an example scenario where a common customer identifier is found among log data received from disparate data sources.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, 464, the vendor can uniquely obtain an insight into user activity, user experience, and system behavior. The system 102 allows the vendor's administrator to search the log data from the three systems 460, 462, 464, thereby obtaining correlated information, such as the order number and corresponding customer ID number of the person placing the order. The system 102 also allows the administrator to see a visualization of related events via a user interface. The administrator can query the system 102 for customer ID field value matches across the log data from the three systems 460, 462, 464 that are stored in the storage system 116. While the customer ID field value exists in the data gathered from the three systems 460, 462, 464, it may be located in different areas of the data given differences in the architecture of the systems. The query system 114 obtains events from the storage system 116 related to the three systems 460, 462, 464. The query system 114 then applies extraction rules to the events in order to extract field values for the field "customer ID" that it can correlate. As described herein, the query system 114 may apply a different extraction rule to each set of events from each system when the event format differs among systems. In this example, a user interface can display to the administrator the events corresponding to the common customer ID field values 472, 474, and 476, thereby providing the administrator with insight into a customer's experience. The system 102 can provide additional user interfaces and reports to aid a user in analyzing the data associated with the customer.

5.0. Facilitating Management of Collection Agents

Collection agents are generally used to collect or obtain data (e.g., from a data source) and provide or forward such data to a data recipient that receives and/or consumes the data. Such data may include, for example, log data, metrics, network packets, traces, and/or the like. Collection agents may exist in various forms. For example, collection agents may be in the form of universal forwarder agents that collect log files, stream forwarder agents that collect network packets (e.g., to analyze incoming and/or outgoing network traffic), and/or OpenTelemetry agents that collect metrics and traces. Collection agents are typically installed in computing infrastructures across various computing devices. In many cases, an extensive number of collection agents are installed across a particular computing infrastructure (e.g., associated with an entity). For example, tens of millions of universal forwarder agents may be installed in a customer infrastructure to collect log data.

In conventional implementations, installation and other management of such collection agents is performed on an individual basis. That is, a user generally initiates installation of collection agents in an agent-by-agent manner. Thereafter, to manage various performance or functionality aspects related to the collection agents, the user manually and separately initiates various actions to be executed in association with the collection agents. For example, assume a software upgrade or a new security certificate is desired for a set of collection agents. In such a case, a user manually initiates a software or certificate update for each collection agent independently. For instance, the user can initiate a software update for a first agent, then initiate a software update for a second agent, and so on. Such manual and individual management of collection agents, however is tedious, particularly when an extensive number of collection agents exist. Further, oftentimes, users do not readily have access to information pertaining to the collection agents. For example, a user may not have visibility into the whether deployed agents are operating in an effective manner or not.

Accordingly, embodiments of the present technology are directed to facilitating management of collection agents. In this regard, embodiments described herein can manage various collection agents in an automated and scalable manner. In particular, embodiments can facilitate management of collection agents by managing agent events associated with the collection agents. An agent event generally refers to an event or function related to a lifecycle of a collection agent. Examples of such agent events include functions or actions related to installation, deployment, configuration (e.g., data destination, types of data), upgrade, downgrade, securities or certificate validation, or other security or performance aspects. Additionally or alternatively, health associated with various collection agents can be managed.

In operation, to manage agent events and/or health associated with collection agents, an agent management service may be used. An agent management service is generally configured to facilitate management of collection agents in an automated and scalable manner. As described herein, an agent management service can include an agent controller and an agent service manager. Generally, an agent controller is a controller installed on a computing device to manage lifecycle and/or health of all the agents that reside or are hosted on that computing device. An agent service manager is generally a service that is remote from agent controllers and communicates with various agent controllers. As describe herein, the agent controllers and the agent service manager communicate with one another to effectuate a scalable management of collection agents (e.g., associated with a customer or entity). Accordingly, multiple collection agents can be managed in a more efficient manner. For example, various collection agents can be monitored in relation to performance or health of the collection agents. Further, any agent events identified for application to a set of collection agents can be managed and/or executed as a set such that individual actions do not need to be separately initiated by a user to effectuate management for each desired collection agent.

Figure 5A:
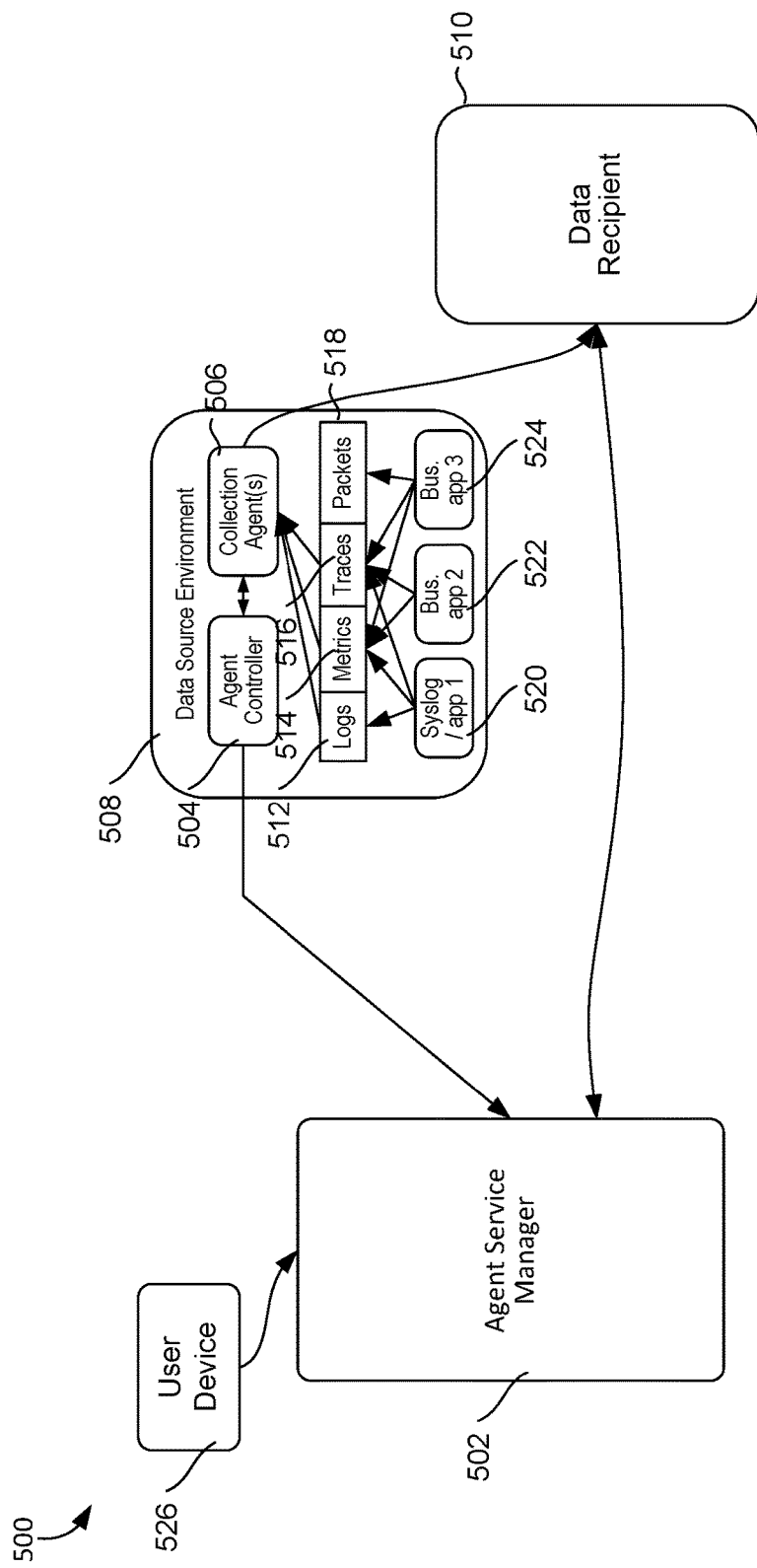
FIG. 5A is a block diagram illustrating an embodiment of an agent management service.

Turning to FIG. 5A, FIG. 5A illustrates an example agent management service environment 500 in accordance with various embodiments of the present disclosure. Generally, the agent management service environment is configured to manage collection agents, for example, to deploy collection agents, configure collection agents, monitor collection agents, and/or the like. As shown in FIG. 5A, the agent management service environment 500 includes an agent service manager 502 and an agent controller(s) 504. The agent service manager 502 and the agent controller 504 communicate with one another to manage collection agent(s) 506.

As shown in FIG. 5A, the agent controller 504 and the collection agent 506 operate within a data source environment 508. A data source environment generally refers to an environment including a source of data from which data is collected and provided to a data recipient, such as data recipient 510. A data source environment may be or include a computing device or machine, for example, that hosts the agent controller 504 and collection agent 506.

A data recipient 510 is generally associated with an entity receiving data (e.g., from collection agent 506). A data recipient may receive, analyze, and/or store the data. In one embodiment, a data recipient 510 is illustrated as data intake and query system 102 of FIG. 1, in which events are generated from the data. In some cases, the data recipient 510 may be associated with a third party or separate from the entity associated with the data source environment. For instance, data collected in association with the data source environment 508 operated via one entity (e.g., customer) is provided to the data recipient 510 for analysis and/or processing via another entity. The data recipient 510 may operate, for example, in a server or cloud environment to analyze and/or process the received data (e.g., logs, metrics, traces, packets, etc.).

As shown, the data source environment 508 includes a collection agent 506. The collection agent 506 may be in any number of forms, such as a universal forwarder agent, a stream forwarder agent, or an open telemetry agent. The collection agent 506 can obtain various types of data, such as logs 512, metrics 514, traces 516, and packets 518. Although illustrated as collecting various types of data, a collection agent may obtain a specific type of data, such as logs. For example, in cases in which the collection agent 506 is a universal forwarder agent, the collection agent may obtain log data. As another example, in cases in which the collection agent 506 is a stream forwarder agent, the collection agent may obtain network packets. As yet another example, in cases in which the collection agent 506 is an open telemetry agent, the collection agent may obtain metrics and traces. Such data may be obtained via various applications in the infrastructure, such as applications 520, 522, and 524. Applications 520, 522, and 524 are presented for illustrative purposes only and may be of any form or number. Upon obtaining or collecting logs 512, metrics 514, traces 516, packets 518, and/or other data, the collection agent 506 provides such data to the data recipient 510. Although only one collection agent 506 is illustrated, any number of collection agents may exist. For example, a computing device or machine within the data source environment 508 may include multiple collection agents that collect data. Such collection agents operating on a single computing device or machine need not be of a same type of collection agent. For example, a single computing device operating in a data source environment may include a universal forwarder(s) agent and a stream forwarder(s) agent, among others.

The agent controller 504 is generally configured to manage a set of collection agents, such as collection agent 506. In particular, the agent controller 504 manages health and/or agent events, or a lifecycle, associated with the collection agent 506. In embodiments, the agent controller 504 is deployed on a computing device on which the collection agent 506 is installed. As a computing device can have any number of collection agents hosted thereon, the agent controller 504 can manage each of such collection agents.

As described, the agent controller 504 can manage any type of collection agent. For example, the agent controller can manage universal forwarder agents, stream forwarder agents, OpenTelemetry agents, and combinations thereof. Although embodiments described herein generally refer to a single agent controller operating on a computing device to manage each of the collection agents installed thereon, any number of agent controllers may exist on a computing device. For instance, one agent controller may manage a first set of 10 collection agents, while another agent controller manages a second set of 10 collection agents.

At a high level, the agent controller 504 communicates with the collection agent 506, among others, to effectuate agent events in association with the collection agent 506. An agent event generally refer to any event or action being performed or to be performed by a collection agent. In particular, an agent event generally relates to an action related to a lifecycle of a collection agent. By way of example only, the agent controller 504 may communicate with the collection agent 506 to initiate performance of configuration updates (e.g., data destination, types of data), upgrades, downgrades, securities or certificate validation, and/or other security or performance aspects associated with the collection agent. The agent controller 504 can additionally or alternatively communicate with the collection agent 506 to monitor health of the collection agent 506.

To manage the collection agent(s) 506, the agent controller 504 communicates with the agent service manager 502. The agent service manager 502 is generally configured to provide control directives to the agent controller 504. A control directive generally refers to a message, request, or instruction that provides an indication of an agent event, that is a task, action, or operation, to perform (e.g., in relation to a lifecycle of a collection agent(s)). Accordingly, the agent service manager 502 may generate and provide control directives to various agent controllers, such as agent controller 504, to effectuate an agent event in association with a set of collection agents, such as collection agent 506.

Generally, the agent service manager 502 generates control directives in accordance with instructions or requests provided via a user device, such as user device 526 operated by a user or entity (e.g., customer). In this way, the user may input or select a desired agent task to be performed in association with a set of collection agents. For example, a user may indicate a desired configuration setting to be applied to each collection agent operated by a particular entity (e.g., the customer). As another example, a user may indicate a desired configuration setting to be applied to a particular set of collection agents operated by a particular entity (e.g., the customer). For instance, a particular configuration setting may be specified for a particular type of collection agents (e.g., stream forwarders), collection agents operating via a particular operating system version, collection agents associated with, or residing within, a particular geographical region, or the like. Such input or instructions may be selected or input in any number of ways via user device 526. For example, a graphical user interface or command line interface may be used to provide a desired agent task(s) and/or an identification of collection agents to which the agent task(s) is to apply. Advantageously, implementations described herein enable a user to initiate agent events in association with various collection agents in an efficient, secure, and scalable manner.

In some embodiments, the agent service manager 502 operates in a multi-tenant cloud service. In such embodiments, the agent service manager 502 operates as a service applicable to any number of tenants, or customers. As such, the agent service manager 502 may communicate with numerous (e.g., millions) of agent controllers operated in various customer or tenant environments. In a multi-tenant environment, the agent service manager 502 can securely provide agent management services for different customers using unique tenant credentials, such as tenant identifiers, and the like. Although the agent service manager 502 is generally described herein as operating in a multi-tenant cloud service, embodiments are not intended to be limited herein. For example, each tenant or customer may operate in connection with a dedicated agent service manager such that the agent service manager only provides services to the particular tenant.

Figure 5B:
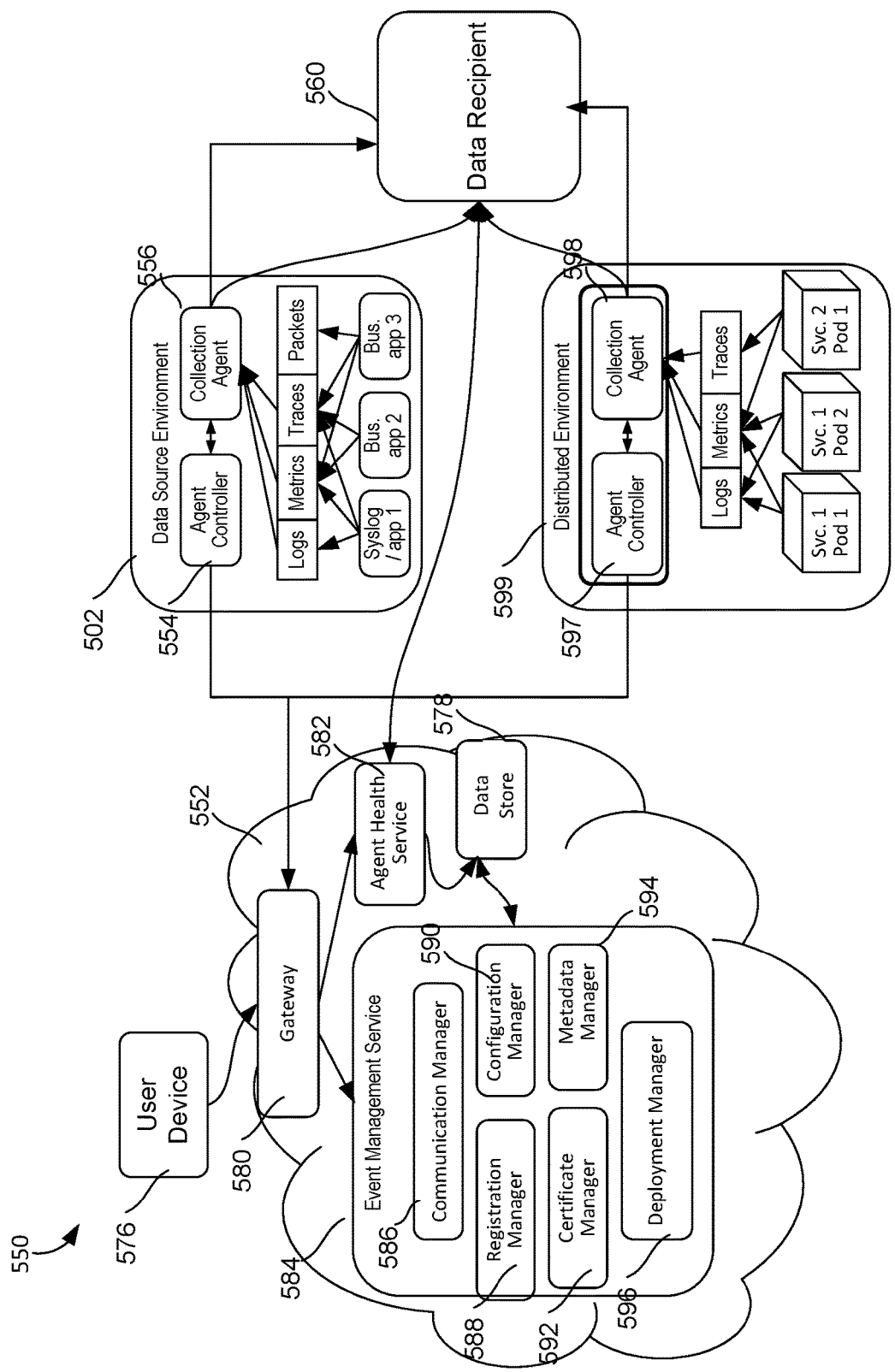
FIG. 5B is a block diagram illustrating another embodiment of an agent management service.

Turning to FIG. 5B, FIG. 5B provides an example embodiment of an agent service manager 552 in an agent management service environment 550. As described, the agent service manager 552 generally communicates with user devices 576 (e.g., associated with any number of customers or tenants) and agent controllers 554 (e.g., operating in data source environments hosted by customers). As shown, the agent service manager 552 includes a gateway 580, an agent health service 582, an event management service 584, and a data store 578.

The data store 578 may be any type or number of data stores. In one embodiment, data store 578 may include a relational data store that captures registration information associated with agent controllers and collection agents. Such a relational data store may also include an audit of agent events (e.g., origination of agent event, date/time of origination, date/time of performance of agent event, status of agent event, etc.) Data store 578 may additional or alternatively include a memory cache to store data.

The gateway 580 is generally configured to obtain communications to the agent service manager 552. In embodiments, the gateway 580 is an application programming interface (API) gateway that is an entry point and performs a standardized process for interactions between the agent service manager 552, agent controllers (e.g., agent controller 554), and user devices (e.g., user device 576). In this way, as communications are received from agent controllers and/or user devices, the gateway 580 can obtain such communications and perform, for example, authentication and authorization of the communication. The gateway 580 may perform any number of functions, such as authorization and/or authentication of communications, associated with the agent service manager 552. In addition to authorization and/or authentication, other functions performed by gateway 580 may include, for example, rate limiting/quota, circuit breaking/throttling, routing and traffic shaping, logging, etc.

Such communications to gateway 580 may include, for example, health data (e.g., from agent controllers), control requests (e.g., from agent controllers), directive responses (e.g., from agent controllers), agent tasks (e.g., from user devices), and/or the like. Upon obtaining such data, the gateway 580 can direct the communications within the agent service manager 552, as appropriate. For example, in one implementation, the gateway 580 can provide health data to the agent health service 582, while other data is directed to the event management service 584 via the communication manager 586, which can distribute to the appropriate manager within the event management service 584.

The agent health service 582 is generally configured to facilitate health monitoring of agent controllers (e.g., agent controller 554) and/or collection agents (e.g., collection agent 556). In this regard, the agent health service 582 can obtain health data from various agent controllers. Such health data may reflect or represent health associated with the agent controller and/or collection agents that the agent controller is managing. In this way, as an agent controller obtains health data from a corresponding collection agent(s), the agent controller can provide such health data to the agent health service 582 (e.g., via the gateway 580). Similarly, the agent controller 554 can provide health data reflecting the health of the agent controller to the agent health service 582.

Health data can be communicated from agent controllers at any time. In some cases, health data is communicated from agent controllers on a periodic basis (e.g., every 5 seconds). In other cases, health data is communicated from agent controllers upon the agent controllers obtaining data (e.g., from agent collectors), upon obtaining a particular amount of health data, upon a request to provide health data, and/or the like. In some implementations, health data may be communicated to the agent service manager 552 separate from other communication, such as control requests. In other implementations, health data may be communicated to the agent service manager 552 in association with other communication (e.g., control requests, etc.).

Health data may include any number or type of data related to health or performance of an agent controller or a collection agent. By way of example only, health data may include a timestamp, deployment/tenant identifier, collection agent identifier, collection agent version, class identifier, timestamp associated with when the collection last successfully sent data, collection agent metrics (e.g., CPU, memory, storage, disk I/O, network statistics, agent throughput, etc.), and/or the like. In this way, health data may indicate whether a collection agent or agent controller is running, whether a collection agent or agent controller is in distress, whether a collection agent or agent controller is running out of resources, etc.

In accordance with obtaining health data, the agent health service 582 may process and/or capture the health data associated with the collection agents and/or agent controllers. In some cases, the agent health service 582 may store the health data in the data store 578. Alternatively or additionally, the agent health service 582 may communicate the health data to a data recipient, such as data recipient 560, for consumption, processing, and/or storing of the data.

The agent health service 582 may also facilitate communication with a user device to provide health data to the user device for viewing by a user (e.g., an individual of a customer or entity associated with the data). For example, a user may request to view health data associated with the corresponding entity's collection agents, or for a specific set of collection agents. In such a case, the agent health service 582 can receive a request for health data and provide relevant data to the user device for viewing the corresponding health data. In some cases, a user may set up an alert(s) related to the health of an agent controller and/or collection agent(s). In such a case, the agent health service 582 can obtain the desired alert and implement the alert at the agent health service 582 or disseminate such an alert to the data recipient 560 that establishes alerts based on the data captured at the data recipient 560.

To efficiently provide health data to a user device for display, a most recent set of health data may be stored in a memory cache accessible by the agent health service 582. For example, a most recent set of health data for each collection agent may be stored in a memory cache. In this way, upon a user request to view health data, the most recent health data can be efficiently accessed and provided to the user. In some cases, the type, or amount, of health information stored in the memory cache may be limited given the cost of in-memory data. For example, a tenant identifier, a collection agent identifier, a timestamp, and a status (e.g., health status of the agent, such as "offline," "sending and healthy," "unhealthy," etc.) may be stored. In such cases, other health data, and/or more historical health data, can be provided to a persistent data store or the data recipient (e.g., data recipient 560) for storage. For example, health data that is not the most recent health data or not of a data type desired for memory storage can be provided to a data recipient for indexing. Such data can be accessed, as needed, for providing to a user device for display.

Figure 6A:
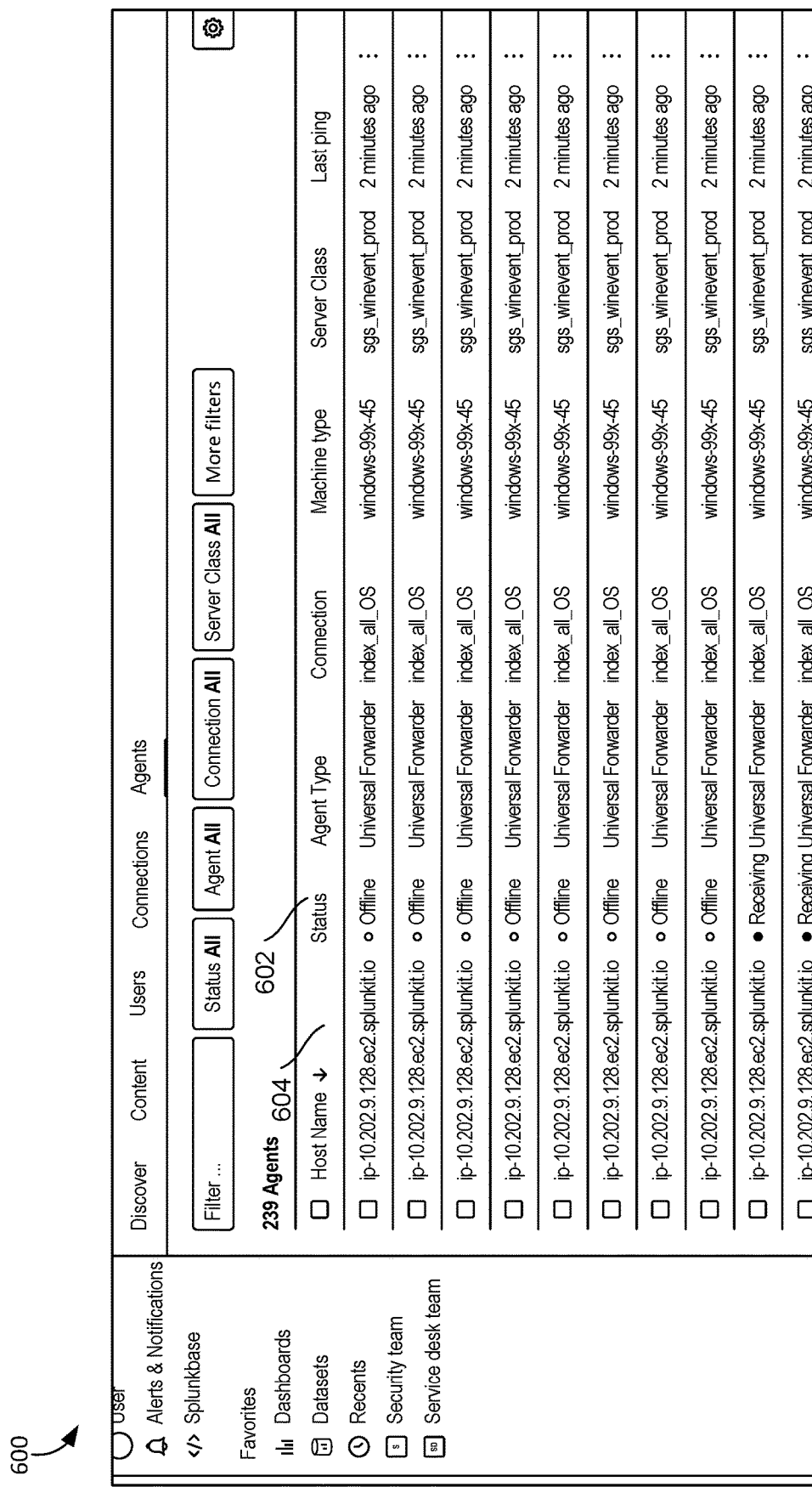
FIG. 6A provides one example of a graphical user interface for displaying health data.
Figure 6B:
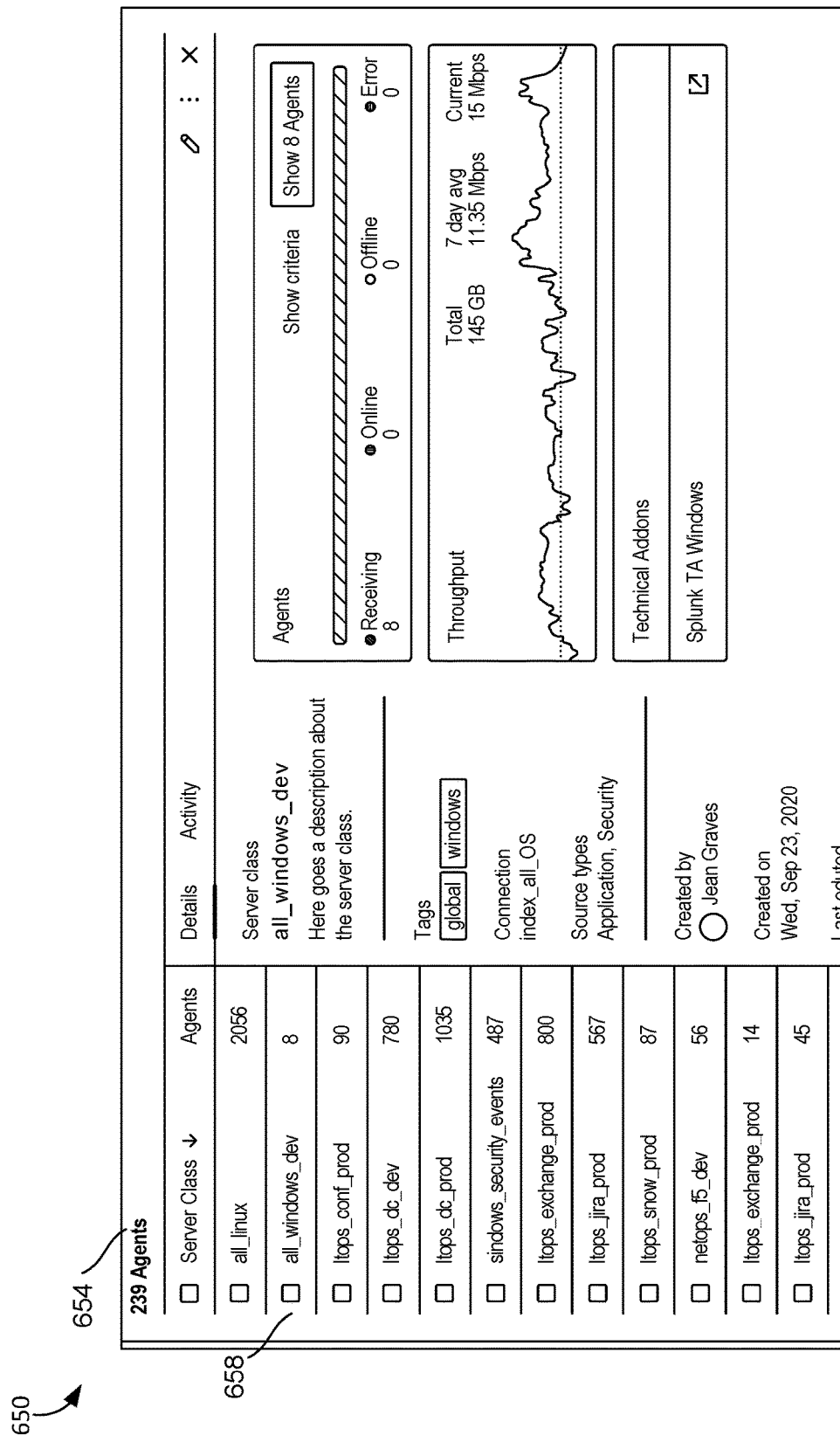
FIG. 6B provides another example of a graphical user interface for displaying health data.

FIG. 6A-6B provide example user interfaces of health data that can be provided to a user device. With reference to FIG. 6A, an example user interface 600 is illustrated that includes a current status (health) 602 of collection agents 604 that a tenant has installed and are managed via agent controllers. FIG. 6B provides an example user interface 650 that includes details of collection agents 654 belonging to a particular set of collection agents. In this example, a set of collection agents 654 is designated via a server class of "all_windows_dev." Upon selection of the server class "all_windows_dev" 658, the corresponding details and/or activities can be presented. In this way, a user can view data related to collection agents of the selected server class. Such collection agent sets, or server classes, can be generated via the user device by a user. For example, a user may select or indicate desired server classes for which the user may wish to view data or manage collection agents. Examples of server classes, or classes, include groupings by operating system, hardware type, version, geographical location, time zone, etc.

Returning to FIG. 5B, as shown, the agent health service 582 may perform as a service separate from the event management service 584. In some embodiments, agent health service 582 may be executed separately due to the amount of health data communicated. In particular, in some cases, health data is frequently obtained at the agent service manager 552. For example, an agent controller may communicate health data to the agent service manager 552 every 5 seconds. Assume tens of millions agent controllers exist and communicate health data every 5 seconds. Due this extensive amount of health data, the agent health service 582 may operate separate from the event management service 584. However, as can be appreciated, a separate service is not required and the agent health service 582 may be performed in association with the event management service.

Although generally described herein as the agent controllers providing health data to the agent service manager 552 for distribution to a data recipient 560, as can be appreciated, other implementations may be used. For example, in other implementations, the agent controllers and/or the collection agents may directly communicate health data to the data recipient 560.

The event management service 584 is generally configured to manage agent events in association with agent controllers and/or collection agents. As described herein, agent events generally refer to any events or actions associated with a lifecycle of an agent controller and/or collection agent. By way of example only, agent events may include actions related to configuration updates (e.g., data destination, types of data), upgrades, downgrades, securities or certificate validation, and/or other security or performance aspects. To manage agent events, the event management service 584 can communicate (e.g., via gateway 580) with agent controllers, such as agent controller 554, and user devices, such as user device 576.

In embodiments, the event management service 584 includes a communication manager 586, a registration manager 588, a configuration manager 590, a certificate manager 592, a metadata manager 594, and a deployment manager 596. Although the various managers are illustrated separately, such functionality can be performed via any number or combination of managers or components. Further, additional or alternative event managers may be used, in accordance with embodiments described herein.

The communication manager 586 is generally configured to manage communication to and/or from the event management service 584. As described herein, agent controllers communicate control requests to the agent service manager 552. As such, among other things, the communication manager 586 is responsible for accepting and distributing the control requests sent from the agent controllers and, in return, providing control directives to the agent controllers, when appropriate.

A control request generally refers to a request that polls the agent service manager 552, or the event management service 584, requesting new information. In some cases, the service can hold the request open until new data is available. Once available, the service responds and sends the new information in the form of a control directive. In some cases, when the agent controller receives the new information, it immediately sends another request, and the operation is repeated. In this way, control requests are communicated from agent controllers to regularly or continually check with the event management service 584 to identify whether any agent events should be performed by the agent controllers and/or corresponding collection agent(s). In other cases, agent controllers may communicate control requests on a periodic basis (e.g., every five seconds).

In accordance with obtaining a control request, the communication manager 586 can read a desired agent event(s) created or generated by other managers of the event management service 584 (e.g., configuration manager, etc.) and provide control directives indicating such desired agent events to appropriate agent controllers in response to control requests. In this regard, control directives may be or include any number of agent events desired to be executed at a control agent and/or collection agent. Control directives may be communicated to agent controllers in any number of formats, such as JSON payloads.

As described herein, agent events to be performed at an agent controller and/or collection agent(s) may be generated based on user input via a user interface at the user device 576. In this regard, a user may specify a group of collection agents for which an agent event is desired to be applied. In other examples, a user may specify a particular device, agent controller, collection agent, etc. for which an agent event is desired. By way of example, an administrator at a customer's premises can provide indications to the event management service 584 of desired agent tasks to be performed. Based on the input, the appropriate manager (e.g., configuration manager, registration manager, etc.) can generate an indication of an agent event to be performed via an agent controller and/or collection agent(s). Examples of agent events include, but are not limited to, a deployment event (e.g. for a collection agent(s)), an upgrade or downgrade event (e.g., for a collection agent(s) and/or agent controller(s)), a start or stop event (e.g., for a collection agent(s) and/or agent controller(s)), a configuration change event (e.g., for a collection agent(s) and/or agent controller(s)), a certificate change event (e.g., for a collection agent(s) and/or an agent controller(s)), or the like.

In some embodiments, the communication manager 586 may communicate with various managers of the event management service 584 to identify any agent events to communicate to the requesting agent controller. In this regard, upon the communication manager 586 obtaining a control request, the communication manager 586 can communicate with other managers of the event management service 584 to identify whether any agent events have been generated or identified to communicate to the requesting agent controller.

Additionally or alternatively, the communication manager 586 may access a data store (e.g., data store 578) to identify any applicable agent event indicators. Agent event indicators may be stored in a memory cache and/or a persistent data store. As one example, the communication manager 586 may initially check against a memory cache (or other data store) to identify whether any agent event indicators are available for or applicable to an agent controller that provided the control request. In some cases, the memory cache may store agent event indicators at a class level indicating a class or group of collection agents. For example, agent event indicators may be stored in the memory cache based on a class level associated with an agent controller and/or collection agent (e.g., to provide an efficient lookup). As described herein, a class, or class level, may be generated for any set of collection agents. For instance, a class level may be specific to a type of collection agent (e.g., universal forwarder), a type of machine or attribute of a machine hosting a collection agent, a geographic region of a collection agent, etc. The control request can include an agent controller identifier(s), a collection agent identifier(s) associated with the agent controller, and/or indication of a class level to facilitate such agent event lookup. Accordingly, based on information in the control request, the memory cache can be used to identify a relevant or applicable agent event desired to be performed. In such embodiments, if the first check at the in-memory cache level is positive, the desired agent event can be retrieved from a persistent data store. In this way, each agent event indicator can be stored and managed at an individual collection agent level in a persistent data store, but flagging at class level in the memory cache can enable efficient serving of control requests. In embodiments, even when there is one specific collection agent that has an associated management in persistent data store, the memory cache entry can be flagged at the class level. Utilizing a memory cache can improve latency as it reduces the number of persistent data store accesses.

In some cases, the communication manager 586 may itself generate an agent event indicator. For example, a communication manager 586 may generate or initiate a start or stop event. Such event indicators generated by the communication manager 586 may be stored (e.g., in a persistent data store) for lookup upon receiving a subsequent control request. An example control directive that includes a start or stop event may include various data, such as tenant identifier, class identifier, agent controller identifier, collection agent identifier, a start/stop/restart indicator, an action target indicator, etc.

Upon identifying an agent event indicator to send to an agent controller, the communication manager 586 can send a control directive that includes such an agent event indicator to the appropriate agent controller for distribution to the collection agent(s), as appropriate. The control directive may include any number of agent event indicators. For example, in one embodiment, each agent event indicator may be communicated via a separate control directive. In another embodiment, each of the applicable agent event indicators for an agent controller may be communicated via a single control directive. In some cases, when an agent controller manages multiple collection agents, separate control directives may be communicated for each collection agent. Further, control directives may include any other type of data, such as tenant identifiers, class identifiers, agent controller identifiers, collection agent identifiers, etc.

In some cases, upon the agent controller communicating the control directive to the appropriate collection agent(s) and/or upon the agent controller(s) executing the received control directive, the agent controller can provide a directive response to the agent service manager 552 with a response or result associated with an agent event. A directive response may include any type of information. For example, the agent controller 554 can communicate a status update indicating completion of the agent event, or data associated therewith, to the agent service manager 552. Such a directive response may be in any format, such as a JSON response. The communication manager 586 may obtain the directive response and store such a response, for example, in a data store 578.

As generally described herein, a control directive is generally communicated to the agent controller in response to a control request from the agent controller. To this end, in response to a control request from the agent controller, a control directive can be communicated to the requesting agent controller. Utilizing control requests from agent controllers to initiate communication of control directives to agent controllers enables a secure environment. In some cases, control requests originating from agent controllers may use OAUTH2 access tokens. As can be appreciated, agent controllers can register with gateway 580 in advance to enable such communication. Although generally described herein as the agent controllers requesting indications of agent events, other implementations can be used. For example, in some cases, the communication manager 586 may push agent event indicators, via control directives, upon such events being generated.

As described, the communication manager 586 communicates with various managers of the event management service 584 to manage various types of agent events. In particular, the communication manager 586 can communicate with the registration manager 588, the configuration manager 590, the certificate manager 592, the metadata manager 594, and the deployment manager 596. Such managers can generate various agent event indicators, and/or control directives associated therewith, to facilitate management of lifecycles associated with agent controllers and/or collection agents. In addition to generating agent events and/or control directives, the originating manager can manage storage of such agent event indicators (e.g., via memory cache and/or persistent storage). That is, the managers can facilitate an audit trail of various agent events, and data associated therewith. For instance, an originating manager can access agent event indicators in a memory cache on a periodic basis (e.g., configurable or default period) and determine whether an agent event has been completed. If so, the agent event entry can be removed from the memory cache.

The registration manager 588 is generally configured to manage registration events. A registration event generally refers to an event associated with registration of an agent controller and/or collection agent. By way of example, assume an agent controller is installed and initiated on a computing device. Further assume the agent controller detects three collection agents existing on the computing device. In such cases, the agent controller can initiate registration of the three collection agents. In this regard, the agent controller can communicate a registration request to the event management service 584 (e.g., at startup and boot). Such a registration request may include any type of data, such as, for example, an agent identifier, an agent version, a class, a node IP address, an operating system identifier, an operating system version, etc. The communication manager 586 can direct the registration request to the registration manager 588 to indicate that the collection agents need to be registered. Based on the registration request, the registration manager 588 can generate a registration agent event. Accordingly, a control directive including the registration agent event can be communicated to the requesting agent controller. In some cases, agent controllers are registered with the event management service before, or in accordance with, its installation.

In embodiments, the registration manager 588 maintains a relational data store including indications of collection agents relative to agent controllers. Such data stored may include, for example, collection agent identifiers, agent controller identifiers, machine identifiers, machine data (e.g., when started, how long running, etc.) to register in the relational data store.

In accordance with agent controllers and/or collection agents being registered via the registration manager 588, the registration manager 588 can also facilitate providing agent controller data and/or collection agent data to users to view. For example, assume a user requests, via a user device, to view how many collection agents exist for the customer. In such a case, the registration manager 588 can access the relational data store and provide such information to the user device to view. As can be appreciated, the registration manager 588 can manage such information at the customer or tenant level such that the data is secure.

The configuration manager 590 is generally configured to manage configurations in association with collection agents and/or agent controllers. In this regard, the configuration manager 590 can manage adding new configurations and/or modifying existing configurations. A configuration generally refers to a manner in which components (e.g., software components) are arranged. By way of example only, a configuration may indicate particular data or files to ingest, filters to apply, an indication to apply regular expressions on incoming data, etc.

A user may select (e.g., via a user device) a desired configuration for a collection agent, or set of collection agents. By way of example only, a user may specify, via user device 576, a desire to use a new configuration for all collection agents of a certain type (e.g., universal forwarders), for example, as indicated by a particular class level. In accordance with obtaining a desired configuration, the configuration manager 590 can translate the request to an agent event for delivery to the specified set of agents (e.g., via the agent controller). Accordingly, in a subsequent control request sent by an agent controller to the communication manager, a control directive including the registration agent event is provided to the agent controller.

In some cases, the configuration manager 590 may provide the agent event to the communication manager 586 for responding to the agent controller. In other cases, the configuration manager 590 may provide the agent event to a data store, such as data store 578, for subsequent access by the communication manager 590 to provide to the agent controller. For example, an agent event indicator may be stored in association with an agent controller, collection agent, and/or class level such that the agent event indicator can be referenced based on a control request sent from an agent controller. As such, upon the communication manager 590 obtaining a control request, the communication manager 590 can access the data store to obtain the configuration agent event indicator and provide in a control directive. Identifying which agent controller(s) to provide such a control directive to may be based on registration details. For example, assume a configuration is to be applied to a class of collection agents. Based on the registration information associated with the collection agents and/or agent controller, appropriate agent controllers to which to disseminate the information can be identified.

The configuration manager 590 can also monitor and track configuration data. Configuration data generally refers to any data associated with a configuration, or configuration event. Configuration data may include, for example, a user that initiated a new or modified configuration, when the configuration event was executed, status of the configuration event, etc. For instance, as directive responses, including status updates, are returned from agent collectors in response to events, the configuration manager 590 can manage storage of such data (e.g., a status of the configuration event). As such, the configuration data can be analyzed and/or provided for viewing by a user. By way of example only, assume a user provides a request to view configurations applied to a particular set of collection agents. In such a case, the configuration manager 590 can access appropriate information and communicate such data to the user device for presentation to the user. In this way, a user may be able to view, a configuration, a time of execution, etc.

The certificate manager 592 is generally configured to manage certificates in association with collection agents and/or agent controllers. As can be appreciated, collection agents may need to communicate with other sources (e.g., data recipients) in a secure manner. Accordingly, collection agents may need a secure sockets layer (SSL) or transport layer security (TLS) certificate to enable such secure communications. To maintain security, the certificates are often updated, for example, at regular intervals. Accordingly, the certificate manager 592 can facilitate management of such certificates (e.g., updating certificates, etc.).

As described, a user may select (e.g., via a user device) a desired certificate for a collection agent, or set of collection agents. By way of example only, a user may specify, via user device 576, a desire to use a new certificate for all collection agents of a certain type (e.g., universal forwarders), for example, as indicated by a particular server class. As another example, an administrator of the collection agents might provide an instruction to push a set of certificates to the collection agents. In some cases, the certificates may be unique for each collection agent.

In accordance with obtaining an indication of a desired certificate, the certificate manager 592 can translate the request to an agent event for delivery to a particular set of agents (e.g., via the agent controller). Accordingly, in a subsequent control request sent by an agent controller to the communication manager, a control directive including a certificate agent event can be provided to the agent controller. The control directive may include any type of information including certificate data, agent controller identifier, collection agent identifier, tenant identifier, etc.

To provide certificate data, in some cases, the certificate manager 592 may interface with a certificate store (not shown) that stores certificates. In such a case, based on a user instruction, the certificate manager 592 can obtain certificate data and communicate such data when the communication manager receives a control request from an agent controller.

In some cases, the certificate manager 592 may provide the agent event indicator to the communication manager 586 for responding to the agent controller. In other cases, the certificate manager 592 may provide the agent event indicator to a data store for subsequent access by the communication manager 586 to provide to the agent controller. For example, the agent event may be stored in association with an agent controller, collection agent, and/or a class level such that the agent event can be referenced based on the control request sent from an agent controller. As such, upon the communication manager 586 obtaining a control request, the communication manager 586 can access a data store (e.g., data store 578) to obtain the agent event indicator and provide to the agent controller via a control directive. Identifying which agent controller to provide such a control directive to may be based on registration details.

The certificate manager 592 can also monitor and track certificate data. Certificate data generally refers to any data associated with a certificate, or certificate event. Certificate data may include, for example, an indication of a selected certificate, a user that initiated a certificate event, a time and/or date of execution of the certificate event, etc. For example, as directive responses, including status updates, are returned from agent collectors in response to the certificate events, the certificate manager 592 can manage storage of such data (e.g., a status of the certificate event). As such, the data can be analyzed and/or provided for viewing by a user. For example, assume a user provides a request to view certificate data applied to a particular set of collection agents. In such a case, the certificate manager 592 can access appropriate information and communicate such data to the user device for presentation to the user. In this way, a user may be able to view specific certificates applied, when they are expiring, etc.

The metadata manager 594 is generally configured to manage metadata in association with collection agents and/or agent controllers. In this regard, the metadata manager 594 can facilitate maintenance of metadata associated with collection agents and/or agent controllers. Metadata for collection agents and/or agent controllers may include, but is not limited to, respective version numbers, an operating system version the component was built on, when the component was deployed, when the component was last started/restarted, etc.

As described, a user may select (e.g., via a user device) desired metadata for a collection agent, or set of collection agents. By way of example only, a user may specify a desire to modify metadata for all collection agents of a certain type (e.g., universal forwarders), for example, as indicated by a particular class. In accordance with obtaining desired metadata, the metadata manager 594 can translate the request to an agent event for delivery to the specified set of agents (e.g., via the agent controller). Accordingly, in a subsequent control request sent by an agent controller to the communication manager 586, a control directive including the agent event is provided to the agent controller. As another example, a user may specify a desire to view what agents are too old or that are operating on unsupported versions. For instance, a user may select to view a list of agents below a certain version number to assess the scope of upgrade. In some cases, the metadata manager 594 may provide an indication of the agent event to the communication manager 586 for responding to the agent controller. In other cases, the metadata manager 594 may provide the agent event to a data store (e.g., data store 578) for subsequent access by the communication manager 586 to provide to the agent controller. For example, the agent event may be stored in association with an agent controller, collection agent, or server class such that the agent event can be referenced based on the control request sent from an agent controller. As such, upon the communication manager 586 obtaining a control request, the communication manager 586 can access a data store to obtain the agent event and provide in a control directive. Identifying which agent controller to provide such a control directive to may be based on registration details.

The metadata manager 594 can also monitor and track metadata. Metadata generally refers to any data associated with an agent controller and/or collection agent, or an event associated therewith, etc. Metadata may include, for example, a user that initiated the metadata task request, when the metadata event was executed, etc. Accordingly, as directive responses, including status updates, are returned from agent collectors in response to the metadata events, the metadata manager 594 can manage storage of such data (e.g., a status of the metadata event). As such, the data can be analyzed and/or provided for viewing by a user. For example, assume a user provides a request to view metadata associated with a particular set of collection agents. In such a case, the metadata manager 594 can access appropriate information and communicate such data to the user device for presentation to the user. In this way, a user may be able to view various metadata associated with a collection agent(s) and/or agent controller(s).

The deployment manager 596 is generally configured to manage deployment, upgrades, and/or downgrades in association with agent controllers and/or collection agents. In this regard, the deployment manager 596 can communicate various instructions to initiate deployment, upgrades, and/or downgrades in connection with agent controllers or collection agents. For example, the deployment manager 596 may manage deployment of the agent controller as well as one or more collection agents (e.g., via the agent controller). As another example, the deployment manager 596 may manage upgrading software versions associated with collection agents. For instance, when a new version is available, the deployment manager 596 can enable automatic upgrade of the collection agent(s).

As described, a user may select (e.g., via user device 576) a desired deployment, upgrade, or downgrade for a collection agent, or set of collection agents. By way of example only, a user may specify a desire to upgrade software in association with all collection agents of a certain type (e.g., universal forwarders), for example, as indicated by a particular class. In accordance with obtaining an indication of a desired deployment or upgrade/downgrade version, the deployment manager 596 can translate the request to an agent event for delivery to the specified set of agents (e.g., via the agent controller). Accordingly, in connection with receiving a subsequent control request sent by an agent controller to the communication manager 586, a control directive including the applicable agent event is provided to the agent controller. In some cases, the deployment manager 596 may provide an indication of an agent event to the communication manager 586 for responding to the agent controller. In other cases, the deployment manager 596 may provide an indication of the agent event to a data store (e.g., data store 578) for subsequent access by the communication manager 586 to provide to the agent controller. For example, the agent event may be stored in association with an agent controller, a collection agent, or a class such that the agent event indicator can be referenced based on the control request sent from an agent controller. As such, upon the communication manager 586 obtaining a control request, the communication manager 586 can access the data store to obtain the agent event and provide in a control directive. Identifying which agent controller to provide such a control directive to may be based on registration details.

The deployment manager 596 can also monitor and track deployment data, upgrade data, and/or downgrade data. Deployment, upgrade, downgrade data generally refers to any data associated with deployment, upgrade, or downgrade associated with a collection agent, or an event associated therewith or device, etc. Such data may include, for example, an indication of a user that initiated the request, when the event was executed, etc. In tracking such data, the deployment manager 596 may store such information. As one example, as directive responses, including status updates, are returned from agent collectors in response to execution of events, the deployment manager 596 can store such data (e.g., via data store 578). As such, the data can be analyzed and/or provided for viewing by a user. For example, assume a user provides a request to view deployment, upgrade, or downgrade data associated with a particular set of collection agents. In such a case, the deployment manager 596 can access appropriate information and communicate such data to the user device for presentation to the user. In this way, a user may be able to view various deployment, upgrade, and/or downgrade data associated with a collection agent(s) and/or agent controller(s).

As shown in FIG. 5B, an agent controller 597 and collection agent 598 may additionally or alternatively be hosted via a distributed environment 599 (e.g., distributed services Kubernetes environment). In some embodiments, for containerized applications deployed in such an environment (e.g., Kubernetes environment), the agent controller, such as agent controller 597, may be deployed at a control plane so that the agent controller has access to APIs to access and manage collection agents.

Figure 7:
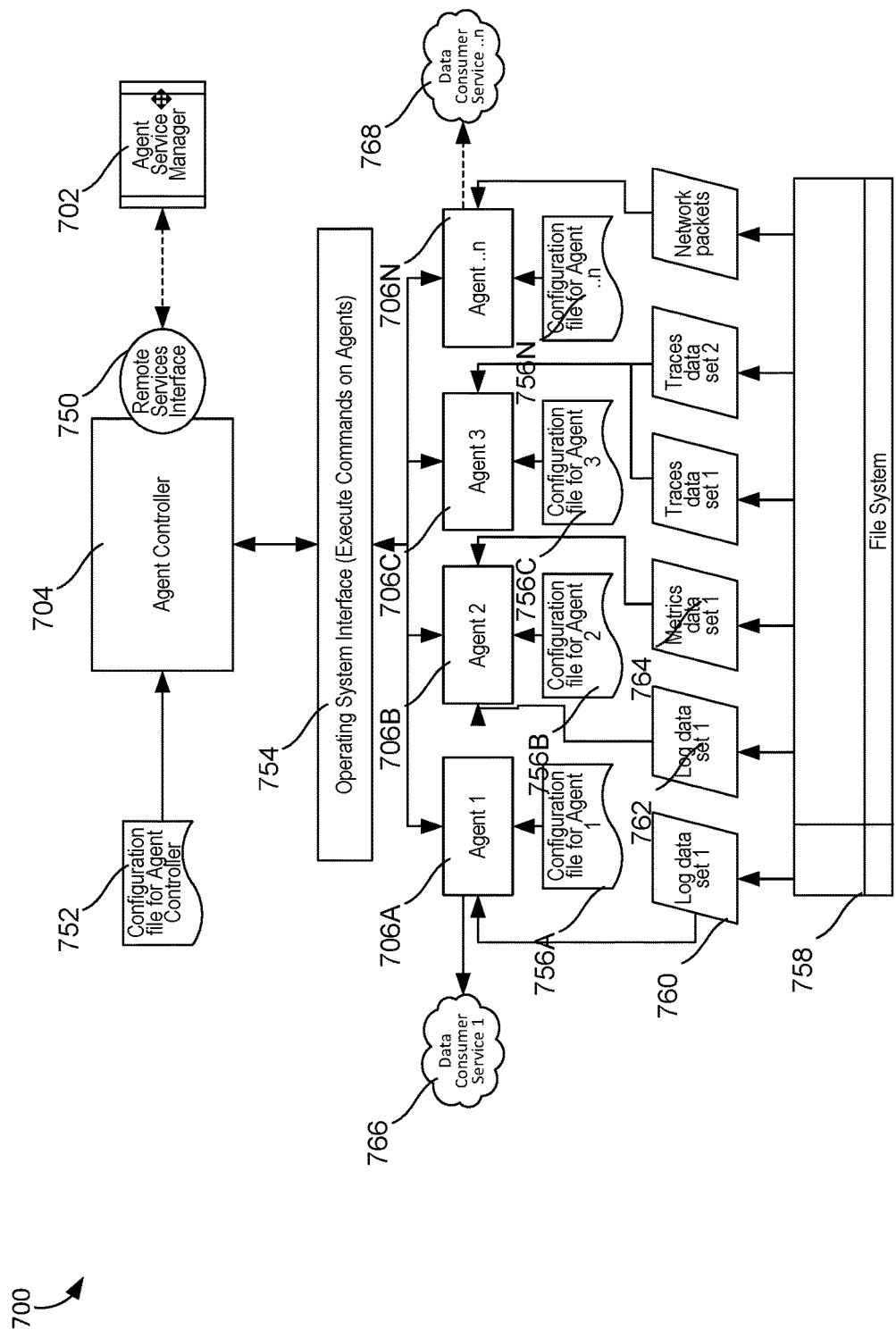
FIG. 7 is a block diagram illustrating an example environment of an agent controller.

As described herein, agent controllers communicate with the agent service manager and collection agents to facilitate management of collection agents. FIG. 7 provides an example environment 700 of an agent controller 704. As shown, the agent controller 704 includes a remote services interface 750 to communicate with the agent service manager 702. An example agent service manager 702 may be the agent service manager 502 of FIG. 5A or the agent service manager 552 of FIG. 5B. As shown, the agent controller 704 can include a configuration file 752. An operating system interface 754 associated with the agent controller 704 can execute various commands in association with collection agents 706A-706N. The particular commands executed may be based on the particular operating system installed. The agent controller 704 can use the underlying operating system of the device to execute the applicable agent events for collection agents 706A-706N.

As shown in FIG. 7, each collection agent 706A-706N has a corresponding configuration file 756A-756N. In embodiments, each collection agent can be configured independently. Each of the collection agents 706A-706N can read data from the file system 758 and collect data based on the respective configuration information. For example, collection agent 706A can read log data 760 from the file system, and collection agent 706B can read log data 762 and metric data 764 from the file system. As the collection agents obtain such data, the data (e.g., log data 760, log data 762, metric data 764) can be provided to the appropriate data recipient, such as data recipient 766 and/or 768. The configuration information associated with the collection agent can indicate where a collection agent is to send data, a format of the data, a frequency for transmitting data, etc.

The agent controller 704 and the collection agents 706A-706N communicate with each other via the operating system interface 754. In this regard, control directives applicable to one or more of the collection agents can be used to execute an action(s) in association with the appropriate collection agent via the operating system interface 754. For example, an agent controller can start/stop a collection agent after changing the collection agent's configuration file. Based on the results of such actions, the agent controller 704 can prepare and provide a directive response, for example, indicating status of the control directives and/or other data associated therewith. For example, the agent controller 704 may provide a status indicating the completion of an agent event, a time of completion of the agent event, etc.

The agent controller 704 and the collection agents 706A-706N can also communicate with one another to convey health data. For example, the collection agents 706A-706N can provide health data to the agent controller 704, for example, on a periodic basis (e.g., every 5 seconds), in response to a request from the agent controller 704 for health data, and/or the like. As described herein, the communication between the agent controller 704 and the collection agents 706A-706N is typically performed within a computing device or distributed environment hosting the agent controller and the collection agents.

Figure 8:
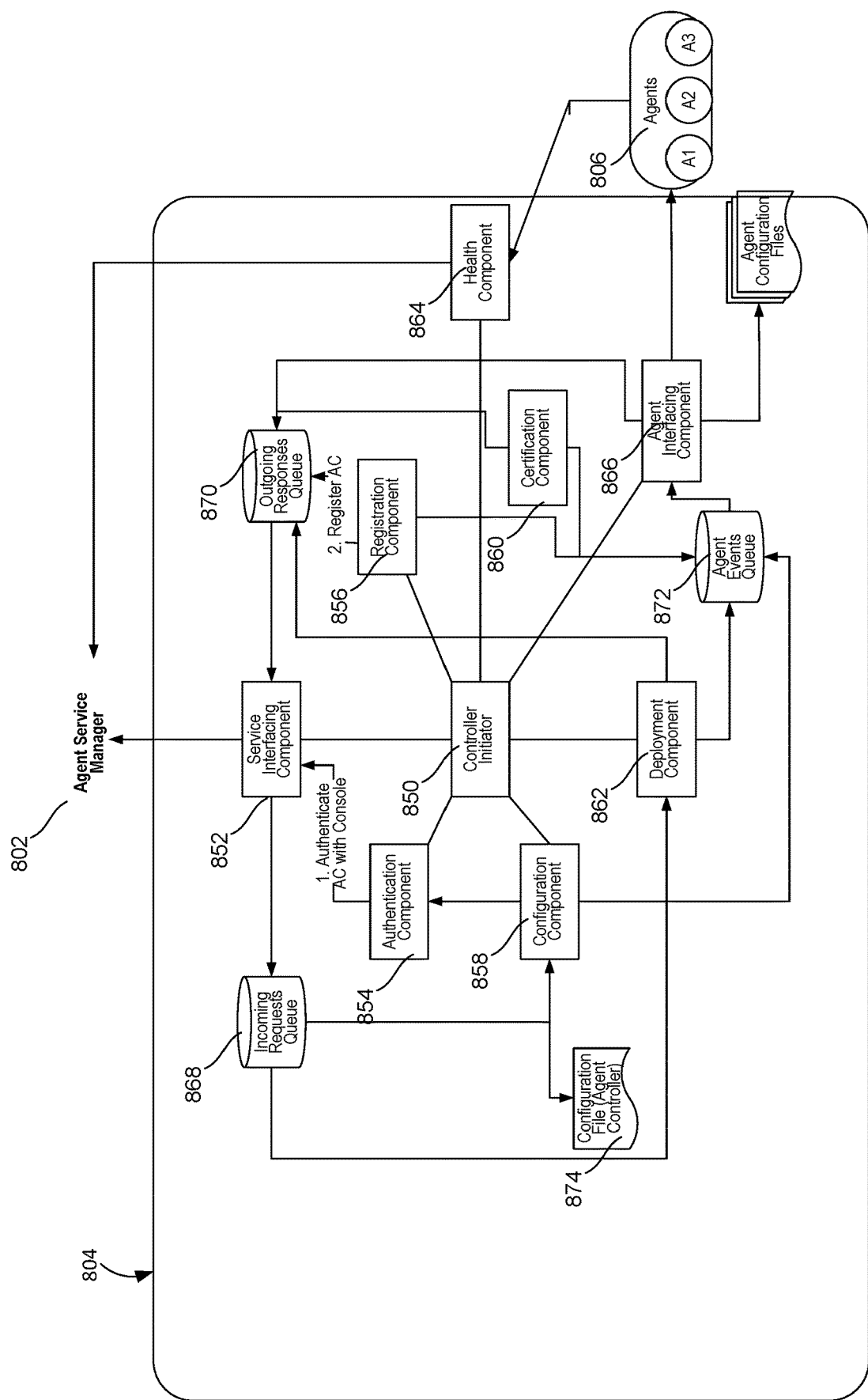
FIG. 8 is a block diagram illustrating an example agent controller.

Turning to FIG. 8, FIG. 8 provides an example implementation of an agent controller 804. As described, an agent controller resides at the data collection source (e.g., via a computing device or distributed environment) and generally obtains various control directives (e.g., restart a collection agent) to manage various collection agents. In embodiments, the agent controller is separate from collection agents. Such separation enables the collection agents to maintain performance and throughput as such aspects should remain unaffected, in accordance with embodiments described herein. Further, advantageously, in instances in which a collection agent terminates, the corresponding agent controller may continue to run and, as such, can continue to report on the health of the collection agent and/or restart the collection agent. With a separation of the agent controller from the collection agents, as can be appreciated, existing collection agents do not need to be changed or reinstalled to implement such an agent management service.

As described herein, the agent controller 804 communicates with the agent service manager 802 and various collection agents 806 to facilitate management of the collection agents 806. The agent controller can include various components and queues to effectuate such management in a scalable manner. In one embodiment, as shown in FIG. 8, the agent controller 804 includes a controller initiator 850, a service interfacing component 852, an authentication component 854, a registration component 856, a configuration component 858, a certification component 860, a deployment component 862, a health component 864, an agent interfacing component 866, an incoming requests queue 868, an outgoing responses queue 870, and an agent events queue 872.

The controller initiator 850 is generally configured to initiate the agent controller 804. In particular, the controller initiator 850 is initiated when the agent controller 804 is started. At a high level, the controller initiator 850 can operate as a bootstrapper that generally manages initiation of the agent controller. Accordingly, the controller initiator 850 can recognize whether appropriate queues and/or configuration files (e.g., configuration file 874) exist. In cases in which a data queue (e.g., a persistent data queue) or a configuration file does not already exist in association with the agent controller 804, the controller initiator 850 can create such a data queue and/or configuration file.

The controller initiator 850 can also initiate various components of the agent controller 804 (e.g., registration component 856, configuration component 858, etc.). To this end, the controller initiator 850 may start and/or stop various components. For example, as a configuration file may be used at the time a controller initiator 850 initiates the agent controller, the controller initiator 850 can initiate or instantiate the configuration component 858 to read the configuration information from the configuration file 874. In addition to initiating various components, the controller initiator 850 can also ensure that components properly terminate, when needed. For example, when an agent controller is shut down or otherwise terminates, the controller initiator 850 can ensure that the components it initiated or spawned are properly terminated. The various activities performed by the controller initiator 850 can be logged into a log file.

In accordance with initiating the agent controller 804, the agent controller 804 registers with the agent service manager 802. In embodiments, registering with the agent service manager 802 enables the agent controller 804 to communicate with the agent service manager 802. To register with the agent service manager 802, authentication may be initially performed. The authentication component 854 can perform authentication steps with the agent service manager 802 (e.g., using an agent controller configuration) via the service interfacing component 852.

Figure 9:
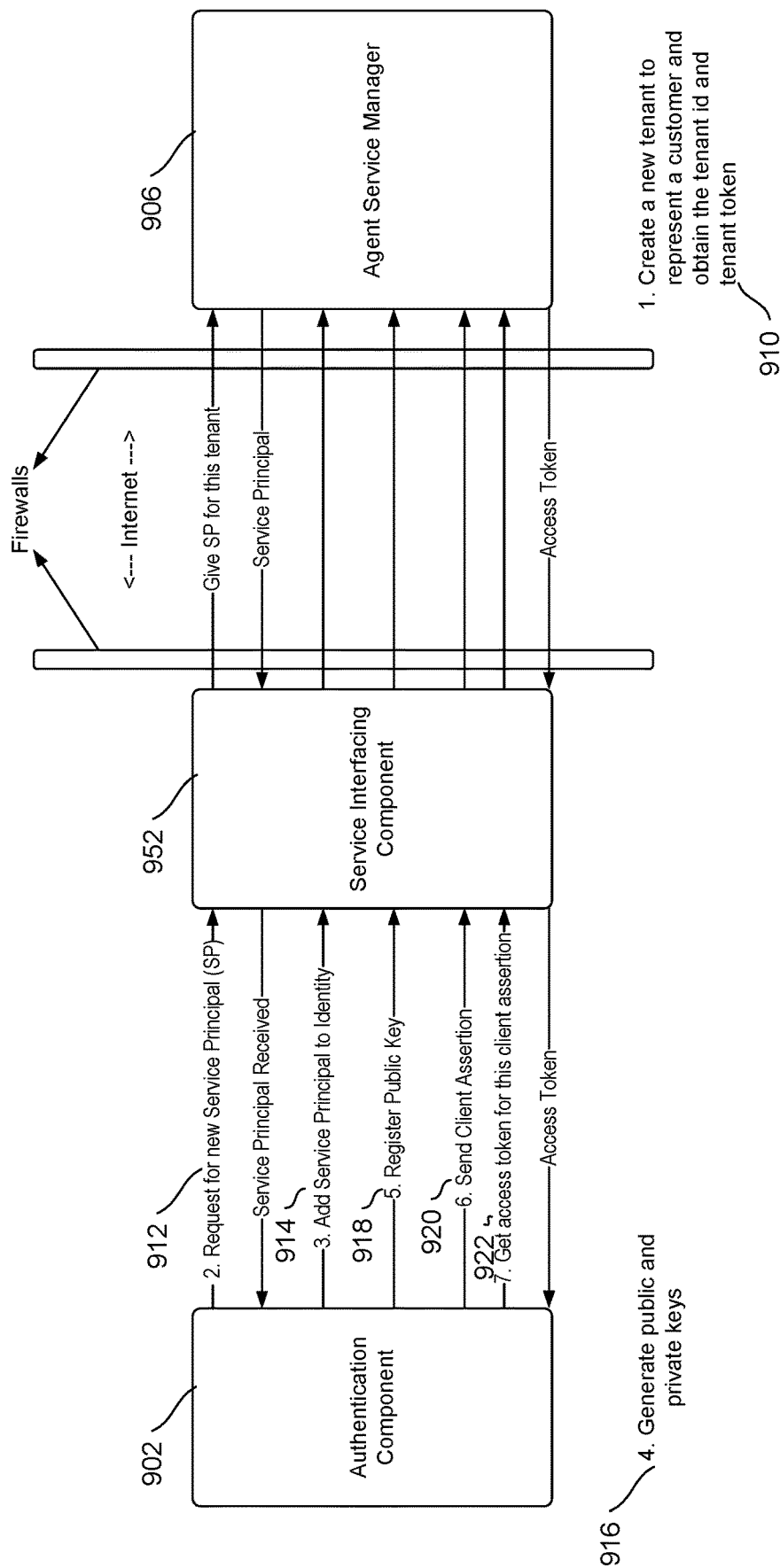
FIG. 9 provides one example implementation used to perform authentication.

One example implementation used to perform authentication is illustrated in FIG. 9. In FIG. 9, the authentication component 902 communicates with the service interfacing component 952 of an agent controller. The service interfacing component 952 can communicate (e.g., over a network, such as the Internet) with the agent service manager 906. As shown at 910, a tenant identifier and tenant token are generated or obtained for a tenant (e.g., representing a customer). Such generation of a tenant identifier and tenant token may be performed at any time prior to initiating authentication. To perform authentication, the authentication component 902 can request a service principal, as shown at 912. For example, the authentication component 902 can make a REST POST call using the generated tenant identifier and tenant token. Thereafter, the service principal is created. For example, an agent controller can create its own service principal on the agent service manager 906, which can then be communicated to the authentication component 902. A service principal can define or indicate what can be performed in association with a specific tenant, who has access rights, and what resources are accessible. Upon obtaining a service principal, the service principal can be added to a service principal group for the tenant (e.g., on the agent service manager 906), as shown at 914.

The authentication component 902 generates a set of public and private keys so that it can encrypt data before sending it to the agent service manager 906, as shown at 916. The authentication component 902 can also encrypt the keys and write the encrypted values to a configuration file. At 918, the authentication component 902 can then register the decrypted public key with the service principal such that the agent service manager 906 can use the key to decrypt an incoming payload(s) from the agent controller. The authentication component 902 can then use the service principal name and its private key to perform the client assertion, as shown at 920. The client assertion (e.g., security token) acts as a client credentials/authorization grant (e.g., as part of OAUTH2) to get the access token. At 922, the client assertion and the token endpoint are used to obtain the access token.

Returning to FIG. 8, upon authentication, the registration component 856 can be used to register the agent controller 804 with the agent service manager 802. In this regard, the registration component 856 can communicate a registration request, for example, via outgoing responses queue 870 and service interfacing component 852, to the agent service manager 802. Such a registration request may include, for instance, an agent controller identifier, a tenant identifier, an operating system associated with the agent controller, a version association with the agent controller, and/or the like. Such an authentication and registration process can be performed automatically by the agent controller. Accordingly, in accordance with deployment of the agent controller 804, the agent controller 804 can automatically register itself with the agent service manager 802.

Upon obtaining a successful registration response, the registration component 856 can use received information to update relevant configuration file (e.g., with agentId) and can set the registration flag to indicate a successful registration. The registration component 856 can provide similar registration tasks for collection agents. For example, upon registering the agent controller 804 with the agent service manager 802, the registration component 856 can detect collection agents 806 operating on the same host as the agent controller. Upon detecting collection agents 806, such agents can also be registered with the agent service manager 802 (for those not already registered).

As described, the controller initiator 850 can initiate various components and queues of the agent controller 804. For example, the controller initiator 850 can initiate service interfacing component 852, authentication component 854, registration component 856, configuration component 858, certification component 860, deployment component 862, health component 864, agent interfacing component 866, incoming request queue 868, outgoing response queue 870, and agent event queue 872.

The service interfacing component 852 is generally configured to communicate with the agent service manager 802. In addition to communicating with the agent service manager 802 to perform authentication and registration, the service interfacing component 852 can send and/or receive other communications related to managing various collection agents 806. As described herein, in some embodiments, the agent controller 804 generally initiates communication or connections with the agent service manager 802. In this regard, the service interfacing component 852 can communicate control requests, directive responses, and/or health data to the agent service manager 802.

Control requests can be communicated from the service interfacing component 852 in a periodic manner so as to poll the agent service manager 802 for any agent events to be performed by the agent controller 804 and/or collection agents 806. In response to a control request, the service interfacing component 852 may receive a control directive including any number of indications of agent events desired to be performed (e.g., via the agent controller and/or collection agent(s)). Such a control directive and/or agent event(s) can be written or provided to the incoming requests queue 868 for storing and queuing.

The service interfacing component 852 can also read and relay responses from other managers of the agent controller 804 to the agent service manager 802. For example, various managers may have directive responses (e.g., including information responsive to a control directive and/or agent event) to provide to the agent service manager 802. In some embodiments, the directive responses may be written or provided to the outgoing responses queue 870. In such embodiments, the service interfacing component 852 may read and relay such directive responses to the agent service manager 802. Upon a successful communication to the agent service manager 802, the service interfacing component 852 may remove or delete the entry from the outgoing response queue 870. The service interfacing component 852 may read and relay any type of information from the outgoing response queue 870, and is not limited to directive responses. Further, the service interfacing component 852 may read and relay information from various queues. For example, in some cases, each manager may have a corresponding queue from which the service interfacing component 852 may read.

The authentication component 854 is generally configured to facilitate authentication with the agent service manager 802. As described, the authentication component 854 can perform authentication steps with the agent service manager 802 (e.g., using an agent controller configuration) via the service interfacing component 852. Upon being initialized, for example, via the controller initiator 850, the authentication component 854 may communicate with the service interfacing component 852 to communicate authentication information to the agent service manager 802. In some cases, such communication with the service interfacing component 852 may be via the outgoing responses queue 870. In such cases, any communications provided to the outgoing responses queue 870 can be read by the service interfacing component 852 and provided to the agent service manager 802. The authentication component 854 may also obtain messages from the agent service manager 802 via the service interfacing component 852. In some cases, such messages may be written to the incoming request queue 868, which can then be read by the authentication component 854.

The registration component 856 is generally configured to facilitate registration with the agent service manager 802. In embodiments, the registration component 856 can obtain registration-related control directives and/or agent event indicators. For example, the registration component 856 may read control directives and/or agent events communicated to the service interfacing component 852 and provided to the incoming requests queue 868. The registration component 856 can process the information and determine an agent event(s) desired to be performed The registration component 856 can then write the agent event indicator to the agent event queue 872. The registration component 856 may remove or delete the related entry in the incoming request queue 868. For example, the registration component may delete an entry from the incoming requests queue upon reading the entry from the queue, upon processing the entry, upon writing an agent event indicator to the agent events queue 872, upon performance of the agent event, etc.

In accordance with the agent event being executed or performed, for example by the agent controller, a response may be provided to the registration component 856. In such cases, the registration component 856 may provide a directive response to the outgoing response queue 870. Based on the response, the registration component 856 may also remove the agent event indicator from the agent event queue 872.

The configuration component 858 is generally configured to facilitate configuration additions and/or modifications in association with the control agent 804 and/or the collection agents 806. In embodiments, the configuration component 858 can obtain configuration-related control directives and/or agent events. For example, the configuration component 858 may read control directives and/or agent event indicators communicated to the incoming request queue 868 via the service interfacing component 852. The registration component 856 can process the information and determine an agent event(s) desired to be performed. The configuration component 858 can then write the agent event indicator to the agent events queue 872. The configuration component 858 may remove or delete the related entry in the incoming requests queue 868. For example, the registration component 856 may delete an entry from the incoming requests queue 868 upon reading the entry from the queue 868, upon processing the entry, upon writing an agent event indicator to the agent events queue 872, upon performance of the agent event, etc.

In accordance with the agent event being executed or performed (e.g., via the agent controller at the applicable collection agent(s)), a response may be provided to the configuration component 858. In such cases, the configuration component 858 may provide a directive response to the outgoing responses queue 870. Based on the response, the configuration component 858 may also remove the agent event indicator from the agent event queue 872.

The certification component 860 is generally configured to facilitate certificate additions and/or modifications in association with the control agent 804 and/or the collection agents 806. In embodiments, the certification component 860 can obtain certification-related control directives and/or agent event indicators. For example, the certification component 860 may read control directives and/or agent event indicators communicated to the incoming request queue 868 via the service interfacing component 852. The certification component 860 can process the information and determine an agent event(s) desired to be performed. The certification component 860 can then write the agent event indicator to the agent events queue 872. The certification component 860 may remove or delete the related entry in the incoming requests queue 868. For example, the certification component 860 may delete an entry from the incoming requests queue upon reading the entry from the queue, upon processing the entry, upon writing an agent event indicator to the agent events queue 872, upon performance of the agent event, etc.

In accordance with the agent event being executed or performed (e.g., via a control agent on the applicable collection agent(s)), a response may be provided to the certification component 860. In such cases, the certification component 860 may provide a directive response to the outgoing responses queue 870. Based on the response, the certification component 860 may also remove the agent event indicator from the agent event queue 872.

The deployment component 862 is generally configured to facilitate deployment, upgrades, and/or downgrades associated with agent controllers and/or collection agents. In this regard, the deployment component 862 may coordinate upgrade/downgrade to the agent control binary itself and/or installation, upgrade/downgrade of one or more collection agents. In embodiments, the deployment component 862 can obtain deployment-related or upgrade/downgrade-related control directives and/or agent events. For example, the deployment component 862 may read control directives and/or agent events communicated to the incoming request queue 868 via the service interfacing component 852. The deployment component 862 can process the information and determine an agent event(s) desired to be performed. The deployment component 862 can then write the agent event indicator to the agent events queue 872. The deployment component 862 may remove or delete the related entry in the incoming requests queue 868. For example, the deployment component may delete an entry from the incoming requests queue upon reading the entry from the queue, upon processing the entry, upon writing an agent event indicator to the agent event queue 872, upon performance of the agent event, etc.

In accordance with the agent event being executed or performed (e.g., via an agent controller on the applicable collection agent(s)), a response may be provided to the deployment component 862. In such cases, the deployment component 862 may provide a directive response to the outgoing responses queue 870. Based on the response, the deployment component 862 may also remove the agent event indicator from the agent event queue 872.

The agent interfacing component 866 is generally configured to interface with collection agents 806. In embodiments, the agent interfacing component 866 execute commands. In this regard, the agent interfacing component 866 can read agent events in the agent events queue 872 and execute such events, or initiate execution thereof. As described, the agent events in the agent events queue 872 can be obtained by various components of the agent controller 804. In embodiments, formation of the particular agent events (commands) for different platforms is handled at the agent service manager 802. In other cases, the agent controller 804 may configure the agent event commands for different platforms.

Upon execution of an agent event, the agent interfacing component 866 can update the status of that agent event and write it to the outgoing responses queue 870. In other examples, the agent event status may be provided to the corresponding component (e.g., certification component 860), for example, to write to the outgoing responses queue 870. In addition to writing the result of the processed agent event to the outgoing responses queue, data associated therewith (e.g., status) can be written or captured in an agent controller log file. In some implementations, the agent interfacing component 866 may also delete the agent event from the agent events queue 872. Further, the agent interfacing component 866 may also remove various requests from the queue that are related to the agent events associated with the agent controller itself (e.g., commands to start/stop itself).

The health component 864 is generally configured to facilitate communication of health data to the agent service manager 802. In embodiments, the health component 864 is initiated by the controller initiator 850. The health component 864 obtains health data associated with the agent controller 804 and/or the collection agents 806 and provides such data to the agent service manager 802. Although illustrated as communicating health data directly to the agent service manager 802, in other cases, the health component may communicate such data to the service interfacing component 852 (e.g., via outgoing responses queue) to communicate to the agent service manager 802. Such a destination of health data may be configured, for example, by the user. To obtain health data associated with various collection agents, the health component 864 can use the agent controller configuration information to monitor the health of such collection agents.

In embodiments, the incoming requests queue 868, the outgoing responses queue 870, and the agent events queue 872 may be persistent. In such cases, if the hosting machine is terminated, the agent controller can resume activities as the queues have been maintained. This enables integrity between the agent controller 804 and the agent service manager 802.

Figure 10:
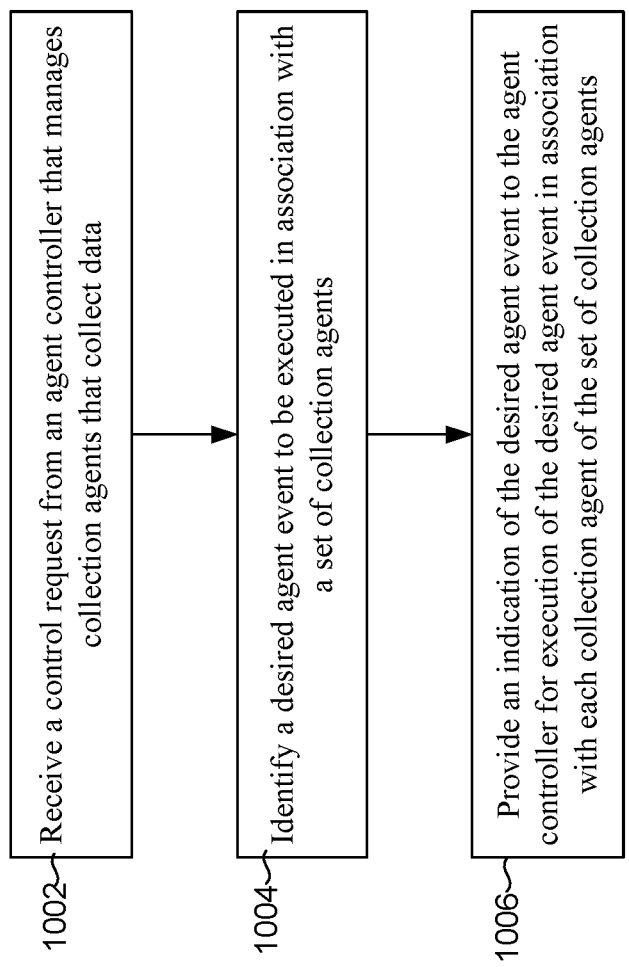
FIG. 10 is a flow diagram illustrating an embodiment of a method for managing a set of collection agents.
Figure 11:
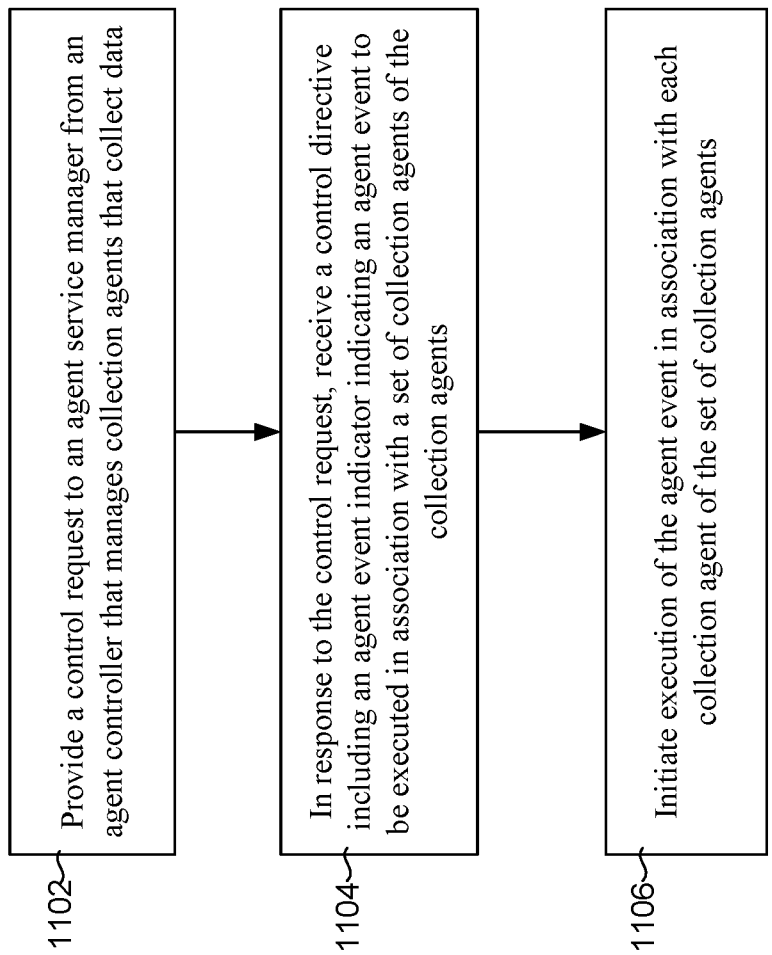
FIG. 11 is a flow diagram illustrating an embodiment of another method for managing a set of collection agents.

FIGS. 10-11 provide example method flows of facilitating management of collection agents, in accordance with embodiments described herein.

FIG. 10 provides one example method for facilitating management of collection agents. Such an example may be performed at an agent service manager, such as agent service manager 552. Initially, at block 1002, a control request is received from an agent controller that manages collection agents that collect data. In embodiments, the agent controller and the collection agents operate on a computing machine remote from an agent service manager that receives the control request. For example, the agent service manager and the agent controller may communicate over the Internet. The control request can poll the agent service manager to request whether any new information exists for the agent controller. At block 1004, a desired agent event to be executed in association with a set of collection agents is identified. The desired agent event may be specified or indicated based on user input (e.g., via a user device). A desired agent event to be executed in association with a set of collection agents may be identified in any number of ways. As one example, an agent event indicator associated with the agent controller and/or set of collection agents may be identified. At block 1006, an indication of the desired agent event is provided to the agent controller for execution of the desired agent event in association with each collection agent of the set of collection agents.

FIG. 11 provides another example method for facilitating management of collection agents. Such an example may be performed at an agent controller, such as agent controller 804. Initially, at block 1102, a control request is provided to an agent service manager from an agent controller that manages collection agents that collect data. In embodiments, the agent controller and the collection agents operate on a computing machine remote from the agent service manager. The control request can be provided at any time, such as, for example, upon a lapse of a predetermined time duration, in accordance with receiving a previous control directive, or the like. At block 1104, in response to the control request, a control directive including an agent event indicator indicating an agent event to be executed in association with a set of collection agents of the collection agents is received. At block 1106, execution of the agent event is initiated in association with each collection agent of the set of collection agents.

6.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (MA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method, comprising:
  receiving, at an agent service manager, a control request from an agent controller that manages collection agents that collect data, wherein the agent controller and the collection agents operate on a remote computing machine, the control request including a class level indicating a class of collection agents that collect data;
  identifying a desired agent event to be executed in association with a set of collection agents of the collection agents managed by the agent controller, the desired agent event comprising an upgrade event, a downgrade event, or a certificate event to be executed in association with the set of collection agents, wherein the desired agent event to be executed is identified based on the class level indicated in the control request; and providing an indication of the desired agent event to the agent controller for execution of the desired agent event in association with each collection agent of the set of collection agents.

2. The method of claim 1, wherein the control request comprises a poll to request any new information to provide to the agent controller.

3. The method of claim 1, wherein the control request is communicated from the agent controller based on an expiration of a time duration.

4. The method of claim 1, wherein the control request is received at a gateway of the agent service manager via the Internet.

5. The method of claim 1, wherein the agent service manager includes a registration manager to manage registration of the agent controller and the collection agents with the agent service manager.

6. The method of claim 1, wherein the agent service manager includes:
a configuration manager to manage configurations associated with the collection agents;
a certificate manager to manage certificate updates associated with the collection agents;
a metadata manager to manage metadata associated with the collection agents; and
a deployment manager to manage deployments, upgrades, and downgrades associated with the collection agents.

7. The method of claim 1, wherein the agent service manager includes an agent health service, wherein the agent health service obtains health data associated with the collection agents communicated from the agent controller and provides the health data to a data store or a data recipient.

8. The method of claim 1, wherein the agent service manager includes an agent health service configured to:
obtain, from the agent controller, health data associated with the collection agents;
provide a most recent set of health data to a memory cache;
provide a less recent set of health data to a persistent data store; and
upon receiving a request to view health data, obtain appropriate health data from the memory cache and/or the persistent data store and provide the appropriate health data to a user device providing the request to view health data.

9. The method of claim 1, wherein the desired agent event to be executed in association with the set of collection agents is input via a user device.

10. The method of claim 1, wherein the desired agent event to be executed in association with the set of collection agents is identified by communicating with a set of managers operating at the agent service manager.

11. The method of claim 1, wherein the desired agent event to be executed in association with the set of collection agents is identified by accessing a data store to identify an agent event indicator associated with the set of collection agents.

12. The method of claim 1, wherein the desired agent event to be executed in association with the set of collection agents is identified by:
accessing a memory cache to determine that an agent event indicator is applicable to the class level communicated in the control request;
based on the determination that the agent event indicator is applicable to the class level communicated in the control request, accessing a persistent data store to identify the desired agent event to be executed in association with the set of collection agents.

13. The method of claim 1 further comprising identifying the set of collection agents for which the desired agent event is to be executed.

14. The method of claim 1 further comprising:
receiving a directive response from the agent controller, the directive response including data associated with the execution of the desired agent event;
storing the data associated with the execution of the desired agent event;
in response to a request from a user device to view information associated with a particular type of agent events, accessing the stored data to provide data associated with the execution of the desired agent event.

15. A computing device, comprising:
a processor; and
a non-transitory computer-readable medium having stored thereon instructions that, when executed by the processor, cause the processor to perform operations including:
receiving, at an agent service manager, a control request from an agent controller that manages collection agents that collect data, wherein the agent controller and the collection agents operate on a remote computing machine, the control request including a class level indicating a class of collection agents that collect data;
identifying a desired agent event to be executed in association with a set of collection agents of the collection agents managed by the agent controller, the desired agent event comprising an upgrade event, a downgrade event, or a certificate event to be executed in association with the set of collection agents, wherein the desired agent event to be executed is identified based on the class level indicated in the control request; and
providing an indication of the desired agent event to the agent controller for execution of the desired agent event in association with each collection agent of the set of collection agents.

16. The computing device of claim 15, wherein the agent service manager includes an agent health service configured to:
obtain, from the agent controller, health data associated with the collection agents;
provide a most recent set of health data to a memory cache;
provide a less recent set of health data to a persistent data store; and
upon receiving a request to view health data, obtain appropriate health data from the memory cache and/or the persistent data store and provide the appropriate health data to a user device providing the request to view health data.

17. The method of claim 1, wherein the desired agent event to be executed in association with the set of collection agents is input via a user device.

18. A non-transitory computer-readable medium having stored thereon instructions that, when executed by one or more processors, cause the one or more processor to perform operations including:
receiving, at an agent service manager, a control request from an agent controller that manages collection agents that collect data, wherein the agent controller and the collection agents operate on a remote computing machine, the control request including a class level indicating a class of collection agents that collect data;

identifying a desired agent event to be executed in association with a set of collection agents of the collection agents managed by the agent controller, the desired agent event comprising an upgrade event, a downgrade event, or a certificate event to be executed in association with the set of collection agents, wherein the desired agent event to be executed is identified based on the class level indicated in the control request; and providing an indication of the desired agent event to the agent controller for execution of the desired agent event in association with each collection agent of the set of collection agents.

\* \* \* \* \*